United States Patent
Hochstetter et al.

(10) Patent No.: US 11,413,832 B2
(45) Date of Patent: *Aug. 16, 2022

(54) FLUIDIZED-BED PROCESS FOR MANUFACTURING A FIBROUS MATERIAL PREIMPREGNATED WITH THERMOPLASTIC POLYMER

(71) Applicant: Arkema France, Colombes (FR)

(72) Inventors: Gilles Hochstetter, L'Hay les Roses (FR); Arthur Pierre Babeau, Begles (FR); Thibaut Savart, Salles (FR); François Tanguy, Mantes-la-Jolie (FR); Denis Huze, Fontaine sous Jouy (FR); Mathieu Capelot, Bernay (FR); Patrice Gaillard, Hagetaubin (FR)

(73) Assignee: Arkema France, Colombes (FR)

( * ) Notice: Subject to any disclaimer, the term of this patent is extended or adjusted under 35 U.S.C. 154(b) by 294 days.

This patent is subject to a terminal disclaimer.

(21) Appl. No.: 16/078,399

(22) PCT Filed: Dec. 20, 2017

(86) PCT No.: PCT/FR2017/053728
§ 371 (c)(1),
(2) Date: Aug. 21, 2018

(87) PCT Pub. No.: WO2018/115736
PCT Pub. Date: Jun. 28, 2018

(65) Prior Publication Data
US 2019/0084252 A1 Mar. 21, 2019

(30) Foreign Application Priority Data
Dec. 22, 2016 (FR) .................................. 1663197

(51) Int. Cl.
*B29C 70/52* (2006.01)
*B29C 70/20* (2006.01)
(Continued)

(52) U.S. Cl.
CPC ............. *B29C 70/523* (2013.01); *B01J 8/382* (2013.01); *B29B 15/12* (2013.01); *B29B 15/122* (2013.01);
(Continued)

(58) Field of Classification Search
CPC ....... B29C 70/523; B29C 70/08; B29C 70/20; B29B 15/12; B29B 15/122; B01J 8/382;
(Continued)

(56) References Cited

U.S. PATENT DOCUMENTS

| 4,541,884 A | 9/1985 | Cogswell et al. |
| 5,137,766 A | 8/1992 | Mazanek et al. |

(Continued)

FOREIGN PATENT DOCUMENTS

| EP | 0201367 A1 | 11/1986 |
| EP | 0324680 A2 | 7/1989 |

(Continued)

OTHER PUBLICATIONS

Korean Office Action for Korean Application No. 10-2018-7024222, dated Dec. 24, 2019, 11 pages.
(Continued)

*Primary Examiner* — Robert J Grun
(74) *Attorney, Agent, or Firm* — RatnerPrestia

(57) ABSTRACT

The invention relates to a process for manufacturing a preimpregnated fibrous material containing a fibrous material made of continuous fibers and at least one thermoplastic polymer matrix, wherein the preimpregnated fibrous material is produced as a single unidirectional tape or of a plurality of parallel unidirectional tapes and wherein the
(Continued)

process includes a step of impregnating, in particular fully and homogeneously, the fibrous material that is in the form of a roving or of several parallel rovings with the at least one thermoplastic polymer matrix that is in powder form, the impregnating step being carried out by a dry route in a tank and the control of the amount of the at least one thermoplastic polymer matrix in said fibrous material being achieved by control of the residence time of said fibrous material in the powder, with the exclusion of any electrostatic process with intentional charging.

27 Claims, 17 Drawing Sheets

(51) Int. Cl.
| | |
|---|---|
| *B29C 70/08* | (2006.01) |
| *B29B 15/12* | (2006.01) |
| *B01J 8/38* | (2006.01) |
| *B29K 101/12* | (2006.01) |
| *B33Y 10/00* | (2015.01) |
| *B33Y 30/00* | (2015.01) |
| *B33Y 70/00* | (2020.01) |
| *B29K 77/00* | (2006.01) |
| *B29K 105/10* | (2006.01) |

(52) U.S. Cl.
CPC .............. *B29C 70/08* (2013.01); *B29C 70/20* (2013.01); *B29K 2077/00* (2013.01); *B29K 2101/12* (2013.01); *B29K 2105/105* (2013.01); *B29K 2995/0012* (2013.01); *B33Y 10/00* (2014.12); *B33Y 30/00* (2014.12); *B33Y 70/00* (2014.12)

(58) Field of Classification Search
CPC ............ B29K 2101/12; B29K 2077/00; B29K 2105/105; B29K 2995/0012; B33Y 10/00; B33Y 30/00; B33Y 70/00
See application file for complete search history.

(56) References Cited

U.S. PATENT DOCUMENTS

| | | | |
|---|---|---|---|
| 5,187,018 A | 2/1993 | Glemet | |
| 5,275,883 A | 1/1994 | Leone et al. | |
| 6,649,264 B1 | 11/2003 | Vodermayer | |
| 8,640,739 B2 | 2/2014 | Do et al. | |
| 10,000,662 B2 | 6/2018 | Hochstetter et al. | |
| 2002/0197397 A1 | 12/2002 | Staheli | |
| 2007/0175570 A1* | 8/2007 | Jentgens | B29C 70/50 156/181 |
| 2013/0248087 A1 | 9/2013 | Gaillard et al. | |
| 2017/0165875 A1 | 6/2017 | Gaillard et al. | |
| 2017/0334094 A1 | 11/2017 | Pellet et al. | |

FOREIGN PATENT DOCUMENTS

| | | |
|---|---|---|
| EP | 0335186 A2 | 10/1989 |
| EP | 0406067 A1 | 1/1991 |
| EP | 1505099 A2 | 2/2005 |
| EP | 2586585 A1 | 5/2013 |
| FR | 2600585 A1 | 12/1987 |
| FR | 3017329 A1 | 8/2015 |
| JP | 06278218 A | 10/1994 |
| JP | 08150664 A | 6/1996 |
| WO | 9220521 A1 | 11/1992 |
| WO | 2008135663 A2 | 11/2008 |
| WO | 2012066241 A2 | 5/2012 |
| WO | 2012164014 A1 | 12/2012 |
| WO | 2015121583 A2 | 8/2015 |
| WO | 2016062896 A1 | 4/2016 |

OTHER PUBLICATIONS

English Translation of Korean Notice of Grounds for Rejection for Korean Application No. 10-2018-7024222, dated Jun. 29, 2020, 11 pages.
International Search Report and Written Opinion for International Application No. PCT/FR2017/053728, Completed Apr. 9, 2018; dated Apr. 18, 2018—8 pages.
Miller et al., "Impregnation Techniques for Thermoplastic Matrix Composites"; Polymers & Polymer Composites, vol. 4, No. 7, 1996—pp. 459-481.
Chinese Office Action for Chinese Application No. 201780012501.3, dated Mar. 26, 2020, 2 pages.

* cited by examiner

FLUIDIZED-BED PROCESS FOR MANUFACTURING A FIBROUS MATERIAL PREIMPREGNATED WITH THERMOPLASTIC POLYMER

CROSS-REFERENCE TO RELATED APPLICATIONS

This is the national phase of International Application No. PCT/FR2017/053728, filed 20 Dec. 2017, which claims priority to French Application No. 1663197, filed 22 Dec. 2016. The disclosure of each of these applications is incorporated herein by reference in its entirety for all purposes.

FIELD OF THE INVENTION

The present invention relates to a process for manufacturing a fibrous material preimpregnated with thermoplastic polymer.

More particularly, the invention relates to a process for manufacturing a preimpregnated fibrous material comprising an impregnation step for the preparation of preimpregnated fibrous material, in particular fully preimpregnated fibrous material, with reduced and controlled porosity, with a view to obtaining tapes of preimpregnated fibrous material, of calibrated dimensions, that can be directly used for the manufacture of three-dimensional composite parts.

BACKGROUND OF THE INVENTION

In the present description, the expression "fibrous material" is understood to mean an assembly of reinforcing fibers. Before the shaping thereof, it is in the form of rovings. After the shaping thereof, it is in the form of strips (or tape), or sheets. When the reinforcing fibers are continuous, the assembly thereof constitutes a woven or a nonwoven (NCF). When the reinforcing fibers are short, the assembly thereof constitutes a felt or a nonwoven.

Such preimpregnated fibrous materials are in particular intended for the production of lightweight composite materials for the manufacture of mechanical parts having a three-dimensional structure and possessing good mechanical and thermal properties. When the fibers are made of carbon or when the resin is filled with suitable additives, these fibrous materials are capable of discharging electrostatic charges. They therefore possess properties that are compatible with the manufacture of parts, especially in the mechanical, civil or military aeronautical, and nautical, motor vehicle, oil and gas, in particular offshore oil or gas, gas storage, energy, health and medical, army and armament, sports and leisure, and electronics fields.

Such impregnated fibrous materials are also referred to as composite materials. They comprise the fibrous material, consisting of reinforcing fibers, and of a matrix consisting of the impregnating polymer. The main role of this matrix is to keep the reinforcing fibers in a compact shape and to give the final product the desired shape. This matrix also ensures the transfer of charge between the fibers and therefore, determines the mechanical strength of the composite. Such a matrix also serves to protect the reinforcing fibers against abrasion and an aggressive environment, to control the surface appearance and to disperse any charges between the fibers. The role of this matrix is important for the long-term strength of the composite material, in particular with regard to fatigue and creep.

A good quality of the three-dimensional composite parts manufactured from preimpregnated fibrous materials it achieved in particular by a control of the process for impregnating the reinforcing fibers with the thermoplastic polymer.

In the present description, the term "strip" is used to denote strips of fibrous material, the width of which is greater than or equal to 400 mm. The term "tape" is used to denote tapes with a calibrated width of less than or equal to 400 mm.

The term "roving" is also used to denote the fibrous material.

Until now, the manufacture of strips of fibrous materials reinforced by impregnation of thermoplastic polymer or of thermosetting polymer was carried out according to several processes that depend in particular on the nature of the polymer, on the type of final composite material desired and on the field of use thereof. The technologies of impregnation by powder deposition or by crosshead extrusion of molten polymer are often used to impregnate the reinforcing fibers with thermosetting polymers, such as epoxy resins for example, as described in patent WO2012/066241A2. These technologies can generally be apply directly to the impregnation by thermoplastic polymers, in particular those with a high glass transition temperature which have a melt viscosity that is too high to obtain a satisfactory impregnation of the fibers and finished or semifinished products of good quality.

Another known impregnation process is the continuous passage of the fibers through an aqueous dispersion of polymer powder aqueous dispersion of polymer particles or aqueous emulsion or suspension of polymer. Reference may for example be made to document EP0324680. In this process uses made of a dispersion of powders of micrometer size (around 20 μm). After soaking in the aqueous solution, the fibers are impregnated with the polymer powder. The process then involves a drying step that consists in passing the impregnated fibers through a first oven in order to evaporate the water absorbed during the soaking. A heat treatment step, consisting in passing the impregnated and dried fibers through a second, temperature heating zone is then necessary in order to melt the polymer so that it adheres, spreads out and covers the fibers.

The main drawback of this method is the uniformity of the deposition which sometimes is not perfect. Another problem linked to this process is the drying time and the energy consumption which greatly affects the production cost. Moreover, the particle size of the powders used is usually fine (typically a D50 by volume of 20 μm) and this also increase the final cost of the preimpregnated tape or preimpregnated sheet.

Furthermore, the drying step of this method induces a porosity in the preimpregnated fibers by evaporation of water.

The preimpregnated fibrous material then needs to be shaped in the form of tapes for example.

Companies market strips of fibrous materials obtained by a method of impregnating unidirectional fibers by passing the fibers, continuously, through a molten bath of thermoplastic polymer, containing an organic solvent such as benzophenone. Reference may for example be made to document U.S. Pat. No. 4 541 884 by Imperial Chemical Industries. The presence of the organic solvent makes it possible in particular to adapt the viscosity of the molten blend and to ensure a good coating of the fibers. The fibers thus preimpregnated are then shaped. They may for example be cut into strips of various weights then placed in a press, then heated at a temperature above the melting temperature of the polymer to ensure the cohesion of the material and in particular the adhesion of the polymer to the fibers. This impregnation and shaping method makes it possible to produce structural parts having a high mechanical strength.

One of the drawbacks of this technique lies in the heating temperature needed to obtain these materials. The melting temperature of the polymers depends in particular on their chemical nature. It may be relatively high for polymethyl methacrylate (PMMA) polymers, or even very high for polyphenylene sulfide (PPS), polyetheretherketone (PEEK) or polyetherketoneketone (PEKK) polymers for example. The heating temperature may therefore rise to temperatures above 250° C., and even above 350° C., which temperatures are much higher than the boiling point and the flash point of the solvent, which are respectively 305° C. and 150° C. for benzophenone. In this case, there is an abrupt departure of the solvent inducing a high porosity within the fibers and consequently giving rise to the appearance of defects in the composite material. This process is therefore difficult to reproduce and entails risks of explosion that endanger the operators. Finally, the use of organic solvents should be avoided for environmental reasons and operator health and safety reasons.

Document EP 0 406 067, filed in the joint names of Atochem and the French State, and also document EP 0 201 367 themselves describe a technique of impregnating on a fluidized bed of polymer powder. The fibers penetrate a closed fluidization tank where, as regards EP 0 406 067, they are optionally separated from one another by means of rollers or grooved rolls, the fibers being electrostatically charged, by friction in contact with these rollers or rolls. This electrostatic charge enables the polymer powder to be bonded to the surface of the fibers and thus to impregnate them.

International application WO 2016/062896 describes an electrostatic method for powder coating a roving with intentional charging, by grounding the roving and applying a potential difference between the tip of a powder coating gun or nozzles and the roving.

Document WO 2008/135663 describes, in a third variant, the production of an impregnated tape of fibers. In this document, the tape of fibers is already preformed prior to the impregnation step, in the form of a tape formed of fibers held together by retaining means.

The tape thus formed is pre-charged with static electricity and immersed in a chamber containing a fluidized bed of fine polymer particles in suspension in compressed air, so as to coat the tape with a layer of polymer coating. Such a document does not make it possible to carry out an impregnation of one or more fiber ravings simultaneously nor a continuous shaping of the preimpregnated rovings in the form of tapes.

Document EP 2 586 585 itself also describes the principle of impregnating fibers by passing them through a fluidized bed of polymer particles. Hand, it is not describe a continuous shaping of one or more rovings thus impregnated, in the form of one or more unidirectional parallel tapes.

Application US 2002/0197397 describes a process for impregnating fibers with a mixture of polymer powders, said mixture being produced without prior compounding directly in a fluidized bed.

International application WO 2015/121583 describes a process for manufacturing a preimpregnated fibrous material by impregnating said material in a fluidized bed then a hot calendering of said roving.

The hot calendering is carried out downstream of the impregnation device and makes it possible to homogenize the distribution of the polymer and the impregnation of the fibers.

The porosity obtained is controlled and reproducible but not quantified.

French patent FR 2600585 describes a fluidized bed process for preimpregnating rovings of glass, carbon and Kevlar fibers, for which the diameter of the fibers is from 5 to 10 µm, with initial spreading of said roving by means of a roller in order to spread the fibers out from one another then passing said spread moving through a fluidized bed composed of plastic particles, the mean diameter of which is within limits that correspond to the diameter of the filaments.

The article by Miller et al.: "Impregnation techniques for thermoplastic matrix composites" (Polymers and Polymer Composites, Rapra Technology, Vol. 4, No. 7, 1 Jan. 1996, pages 459-481) describes various processes for preimpregnating rovings, in particular in a fluidized bed with a polymer in powder form, with no mention of the residence time of the roving in the powder, nor of the volume diameter D50 of the powder particles.

Document EP 0 335 186 describes the possibility of using a calender or a press for compacting a composite comprising preimpregnated metal fibers, which is used for the manufacture of a molded body for shielding against electromagnetic radiation. It does not describe the fact of impregnating one or more fiber rovings and of shaping them, continuously, in the form of one or more unidirectional parallel tapes by hot calendering.

Regarding the shaping of preimpregnated fibrous materials in the form of calibrated tapes, suitable for the manufacture of three-dimensional composite parts by automated layup using a robot, this is in general carried out in post-treatment.

Thus, document WO 92/20521 describes the possibility of impregnating a fiber roving by passing it through a fluidized bed of thermoplastic powder particles. The fibers thus covered with polymer particles are heated in an oven or a heating device so that the polymer penetrates well and covers the fibers. A post treatment of the preimpregnated fibrous reinforcement obtained, may consist in passing it through a set of polishing rollers making it possible to improve the impregnation by the still liquid matrix. One or more superimposed fibrous reinforcements may additionally be placed between two rollers so as to form a strip.

Such a document does not make it possible to carry out an impregnation of one or more fiber rovings and a continuous shaping of the preimpregnated rovings in the form of unidirectional parallel tapes.

The quality of the tapes of preimpregnated fibrous material, and therefore the quality of the final composite material, depends not only on the homogeneity of the impregnation of the fibers and therefore on the control and reproducibility of the porosity of the preimpregnated fibrous material, but also on the size and optically on the width and on the thickness of the final tapes. Specifically, a uniformity and a control of these two dimensional parameters makes it possible to improve the mechanical strength of the materials.

Currently, irrespective of the process used for the impregnation of the fibrous materials, the manufacture of narrow tapes, i.e. having a width of less than 400 mm, generally requires a slitting (i.e. a cutting) of strips having a width of greater than 400 mm, also referred to as sheets. The tapes thus sized are then taken to be laid up by a robot using a head. Moreover, since the roles of sheets do not exceed a length of around 1 km, the tapes obtained after cutting are not in general long enough to manufacture certain large-size composite parts during robotic layup. The tapes must therefore be joined end-to-end in order to obtain a greater length, thus creating overthicknesses. These overthicknesses lead to the appearance of heterogeneity is that are prejudicial to obtaining good quality composite materials constituting said composite parts. Furthermore, these overthicknesses require downtime and the restart of the robot and therefore loss of time and productivity.

The current techniques for impregnating fibrous materials and for shaping such preimpregnated fibrous materials in the form of calibrated tapes therefore have several drawbacks. It is for example difficult to uniformly heat a molten blend of thermoplastic polymers in a die and at the die outlet, down to the core of the material, which impairs the quality of the impregnation. Furthermore, the temperature difference that exists between the fibers and a molten blend of polymers at the impregnation die also impairs the quality and homogeneity of the impregnation. Moreover, this molten method of impregnation does not make it possible to obtain high contents of fibers or high production rates due to the high viscosity of the thermoplastic resins, especially when they have high glass transition temperatures, which is necessary for obtaining high-performance composite materials. The use of organic solvents generally involves the appearance of defects in the material and also environmental, health and safety hazards in general. The shaping, by high-temperature post-treatment of the preimpregnated fibrous material in the form of strips, remains difficult because it still does not enable a homogeneous distribution of the polymer within the fibers which leads to a lower quality material with a poorly controlled porosity being obtained. The slitting of sheets to obtain calibrated tapes and the end-to-end joining of these tapes results in a supplementary production cost. Slitting also gives rise to significant problems of dust which contaminates the tapes of preimpregnated fibrous materials used for the robotic layup and may lead to malfunctions of the robots and/or imperfections on the composites. This potentially leads to costs for repairing the robots, a shutdown of the production and the scrapping of non-compliant products. Finally, during the slitting step, a significant amount of fibers is deteriorated, leading to a loss of properties, and especially a reduction in the mechanical strength and in the conductivity, of the tapes of preimpregnated fibrous material.

Furthermore, the impregnation is still not carried out fully and although said documents cited above indicate a full impregnation, it turns out that the porosity obtained is too high, especially for the applications listed above.

The aim of the invention is thus to overcome at least one of the drawbacks of the prior art.

The invention especially aims to provide a process for manufacturing a preimpregnated fibrous material, by an impregnation technique that combines a control of the residence time in the impregnation device with a control of the fanning out of said fibrous material in said device, and to obtain a preimpregnated fibrous material having a homogeneous impregnation of the fibers, especially a full impregnation, and control dimensions, with a reduced, controlled and reproducible porosity on which the performance of the final composite part is dependent.

SUMMARY OF THE INVENTION

For this purpose, one subject of the invention is a process for manufacturing a preimpregnated fibrous material comprising a fibrous material made of continuous fibers and at least one thermoplastic polymer matrix, comprising a step of impregnating, in particular fully, said fibrous material that is in the form of a roving or of several parallel ravings with said at least one thermoplastic polymer matrix that is in powder form.

The invention also relates to a unidirectional tape of preimpregnated fibrous material, in particular tape wound on a reel, characterized in that it is obtained by a process as defined above.

The invention further relates to a use of the tape as defined above in the manufacture of three-dimensional parts. Said manufacture of said composite parts relates to the fields of transport, in particular motor vehicle transport, of oil and gas, in particular offshore, of gas storage, civil or military aeronautical, nautical and railroad transport; of renewable energy, in particular wind turbine or marine turbine, energy storage devices, solar panels; thermal protection panels; sports and leisure, health and medical, ballistics with weapon or missile parts, safety and electronics. The invention also relates to a three-dimensional composite part, characterized in that it results from the use of at least one unidirectional tape of preimpregnated fibrous material as defined above.

DETAILED DESCRIPTION OF THE INVENTION

One subject of the invention is a process for manufacturing a preimpregnated fibrous material comprising a fibrous material made of continuous fibers and at least one thermoplastic polymer matrix, characterized in that said preimpregnated fibrous material is produced as a single unidirectional tape or of a plurality of parallel unidirectional tapes and in that said process comprises a step of impregnating, in particular fully and homogeneously, said fibrous material that is in the form of a roving or of several parallel ravings with said at least one thermoplastic polymer matrix that is in powder form, said impregnating step being carried out by a dry route in a tank and the control of the amount of said at least one thermoplastic polymer matrix in said fibrous material being achieved by control of the residence time of said fibrous material in the powder, with the exclusion of any electrostatic process with intentional charging.

Advantageously, the volume mean diameter D50 of the thermoplastic polymer powder particles is from 30 to 300 µm, in particular from 50 to 200 µm, more particularly from 70 to 200 µm.

The expression "residence time in the powder" means the time during which the roving is in contact with said powder in the fluidized bed.

The inventors have unexpectedly found that the control of the residence time in the powder made it possible to impregnate the fibrous material with the thermoplastic polymer matrix, in particular fully and homogeneously with a well-controlled content of powder (resin).

The term "homogeneous" means that the impregnation is uniform and there is no reduction in the width of the tapes nor drive fibers at the surface of the preimpregnated fibrous material.

Polymer Matrix

A thermoplastic, or thermoplastic polymer, is understood to mean a material that is generally solid at room temperature, which may be semicrystalline or amorphous, and which softens during an increase in temperature, in particular after passing its glass transition temperature (Tg) and flows at higher temperature when it is amorphous, or that may exhibit obvious melting on passing its melting temperature (Tm) when it is semicrystalline, and which becomes solid again during a reduction in temperature below its crystallization temperature (for a semicrystalline polymer) and below its glass transition temperature (for an amorphous polymer).

The Tg and Tm are determined by differential scanning calorimetry (DSC) according to the standards 11357-2: 2013 and 11357-3: 2013 respectively.

Regarding the polymer constituting the matrix for impregnating the fibrous material, this is advantageously a thermoplastic polymer or a blend of thermoplastic polymers. This thermoplastic polymer or polymer blend is ground in powder form, in order to be able to use it in a device such as a tank, in particular a fluidized bed tank.

The device in the form of a tank, in particular a fluidized bed tank, may be open or closed.

Optionally, the thermoplastic polymer or blend of thermoplastic polymers further comprises carbon-based fillers, in particular carbon black or carbon-based nanofillers, preferably chosen from carbon-based nanofillers, in particular graphenes and/or carbon nanotubes and/or carbon tenofibrils, or mixtures thereof. These fillers make it possible to conduct electricity and heat, and consequently make it possible to improve the lubrication of the polymer matrix when it is heated.

Optionally, said thermoplastic polymer comprises at least one additive, in particular chosen from a catalyst, an antioxidant, a heat stabilizer, UV stabilizer, a light stabilizer, a lubricant, a filler, plasticizer, a flame retardant, a nucleating agent, a chain extender and a dye or a mixture of these.

According to another variant, the thermoplastic polymer or blend of thermoplastic polymers may further comprise liquid crystal polymers or cyclic polybutylene terephthalate, or mixtures containing same, such as the CBT100 resin marketed by the company CYCLICS CORPORATION. This compound make it possible in particular to fluidise the polymer matrix in the molten state, for a better penetration to the core of the fibers. Depending on the nature of the polymer, or blend of thermoplastic polymers, used for producing the impregnation matrix, in particular its melting temperature, one or other of these compounds will be chosen.

The thermoplastic polymers that are incorporated into the composition of the impregnation matrix of the fibrous material, may be chosen from:
  polymers and copolymers from the family of aliphatic or cycloaliphatic polyamides (PAs) or semi-aromatic PAs (also referred to as polyphthalamides (PPAs)),
  polyureas, in particular aromatic polyureas,
  polymers and copolymers from the family of acrylics such as polyacrylates, and more particularly polymethyl methacrylate (PMMA) or derivatives thereof,
  polymers and copolymers from the family of polyaryl ether ketones (PAEKs) such as polyether ether ketone) (PEEK), or polyaryl ether ketone ketones (PAEKKs) such as polyether ketone ketone (PEKK) or derivatives thereof,
  aromatic polyether imides (PEIs),
  polyaryl sulfides, in particular polyphenylene sulfides (PPSs),
  polyaryl sulfones, in particular polyphenylene sulfones (PPSUs),
  polyolefins, in particular polypropylene (PP);
  polylactic acid (PLA),
  polyvinyl alcohol (PVA),
  fluoropolymers, in particular polyvinylidene fluoride (PVDF) or polyte rafluoroethylene (PTFE) or polychlorotrifluoroethylene (PCTFE),
  and blends thereof.

Advantageously, when said thermoplastic polymer is a blend, it is added to the tank in the form of a powder obtained previously by "dry blending" or compounding or directly to the tank in the form of a "dry blend".

Advantageously, it is added in the form of a powder obtained previously by "dry blending" or directly to the tank in the form of a "dry blend" and the blend is a blend of PEKK and PEI.

Advantageously, when said polymer is a blend of two polymers P1 and P2, the proportion by weight of polymer P1 and P2 is from 1-99% to 99-1%.

Advantageously, the PEKK/PEI blend is from 90-10% to 60-40% by weight, in particular from 90-10% to 70-30% by weight.

The thermoplastic polymer may correspond to the non-reactive final polymer that will impregnate the fibrous material or to a reactive prepolymer, which will also impregnate the fibrous material, but is capable of reacting with itself or with another prepolymer, as a function of the chain end is borne by said prepolymer, after impregnation, or else with a chain extender and in particular during heating on a heated calender.

According to a first possibility, said prepolymer may comprise or consist of at least one reactive prepolymer (polyamide) bearing on the same chain (that is to say, on the same prepolymer), two end functions X' and Y' which are respectively coreactive with one another by condensation, more particularly with X' and Y' being amine and carboxyl or carboxyl and amine respectively. According to a second possibility, said prepolymer may comprise or consist of at least two polyamide prepolymers which are reactive with one another and which each respectively bear two end functions X' or Y', which are identical (identical for the same prepolymer and different between the two prepolymers), said function X' of one prepolymer being able to react only with said function Y' of the other prepolymer, in particular by condensation, more particularly with X' and Y' being amine and carboxyl or carboxyl and amine respectively.

According to a third possibility, said pre-polymer may comprise or consist of at least one prepolymer of said thermoplastic polyamide polymer, bearing n reactive end functions X, chosen from: —NH$_2$, —CO$_2$H and —OH, preferably NH$_2$ and —CO$_2$H with n being 1 to 3, preferably from 1 to 2, more preferentially 1 or 2, more particularly 2 and at least one chain extender Y-A'-Y, with A' being a hydrocarbon biradical of nonpolymeric structure, bearing 2 identical reactive end functions Y, which are reactive by polyaddition with at least one function X of said prepolymer a1), preferably with a molecular weight of less than 500 and more preferentially of less than 400.

The number-average molecular weight Mn of said final polymer of the thermoplastic matrix is preferably within a range extending from 10 000 to 40 000, preferably from 12 000 to 30 000. These Mn values can correspond to inherent viscosities greater than or equal to 0.8, as determined according in m-cresol according to the standard ISO 307: 2007, but changing the solvent (use of m-cresol in place of sulfuric acid and the temperature being 20° C.).

Said reactive prepolymers according to the two options mentioned above have a number-average molecular weight Mn ranging from 500 to 10 000, preferably from 1000 to 6000, in particular from 2500 to 6000.

The Mns are determined in particular by calculation on the basis of the content of the end functions, determined by potentiometric titration in solution, and the functionality of said prepolymers. The weights Mn can also be determined by size exclusion chromatography or by NMR.

The nomenclature used to define polyamides is described in the standard ISO 1874-1:2011 "Plastics—Polyamide (PA) moulding and extrusion materials—Part 1: Designation", in particular on page 3 (tables 1 and 2), and is well known to a person skilled in the art. The polyamide may be a homopolyamide or a copolymer or a blend thereof.

Advantageously, the polymers constituting the matrix are chosen from polyamides (PAs), in particular chosen from aliphatic polyamides, especially PA11 and PA12, cycloaliphatic polyamides, and semiaromatic polyamides (polyphthalamides) optionally modified by urea moieties, and copolymers thereof, polymethyl methacrylate (PPMA) and copolymers thereof, polyether imides (PEIs), polyphenylene sulfide (PPS), polyphenylene sulfone (PPSU), polyether ketone ketone (PEKK), polyether ether ketone (PEEK), fluoropolymers such as polyvinylidene fluoride (PVDF).

For the fluoropolymers, it is possible to use a homopolymer of vinylidene fluoride (VDF of formula $CH_2=CF_2$) or a copolymer of VDF comprising by weight at least 50% by weight of VDF and at least one other monomer copolymerizable with the VDF. The content of EDF must be greater than 80% by weight, or even better at 90% by weight, to ensure a good mechanical strength for the structural part, especially when it is subjected to thermal and chemical stresses. The comonomer may be a fluoromonomer such as for example vinyl fluoride.

For structural parts that have to withstand high temperatures, besides the fluoropolymers, uses advantageously made according to the invention of PAEKs (polyaryl ether ketones) such as polyether ketones (PEKs), polyether ether ketone (PEEK), polyether ketone ketone (PEKK), polyether ketone ether ketone ketone (PEKEKK) or Pas having high glass transition temperature Tg.

Advantageously, said thermoplastic polymer is a polymer having a glass transition temperature such that Tg≥80° C. or a semicrystalline polymer having a melting temperature Tm≥150° C.

Advantageously, said thermoplastic polymer is:

an aliphatic polyamide chosen from polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (P41012), or a blend thereof or a copolymer thereof, a semiaromatic polyamide, optionally modified by urea moieties, especially a semiaromatic polyamide of formula X/YAr, as described in EP 1 505 099, especially a semiaromatic polyamide of formula A/XT in which A is chosen from a moiety obtained from an amino acid, a moiety obtained from a lactam and a moiety corresponding to the formula (Ca diamine)·(Cb diacid), with a representing the number of carbon atoms of the diamine and b representing the number of carbon atoms of the diacid, a and b each being between 4 and 36, advantageously between 9 and 18, the (Ca diamine) moiety being chosen from linear or branched aliphatic diamines, cycloaliphatic diamines and alkylaromatic diamines and the (Cb diacid) moiety being chosen from linear or branched aliphatic diacids, cycloaliphatic diacids and aromatic diacids;

X.T denotes a moiety obtained from the polycondensation of a Cx diamine and terephthalic acid, with x representing the number of carbon atoms of the Cx diamine, x being between 6 and 36, advantageously between 9 and 18, especially a polyamide of formula A/6T, A/9T, A/10T or A/11T, A being as defined above, in particular a polyamide PA 6/6T, 66/6T, 6I/6T, MPMDT/6T, PA11/10T, 11/6T/10T, MXDT/10T or MPMDT/10T, BACT/10T, MXD6 and MXD10 and block copolymers, especially polyamide/polyether (PEBA).

T corresponds to terephthalic acid, MXD corresponds to m-xylylenediamine, MPMD corresponds to methylpentamethylenediamine and BAC corresponds to bis(aminomethyl) cyclohexane.

Fibrous Material:

Regarding the fibers constituting said fibrous material, there are especially fibers of mineral, organic or plant origin. Among the fibers of mineral origin, mention may be made of carbon fibers, glass fibers, basalt fibers, silica fibers or silicon carbide fibers for example. Among the fibers of organic origin, mention may be made of fibers based on a thermoplastic or thermosetting polymer, such as semi-aromatic polyamide fibers, aramid fibers or polyolefin fibers for example. Preferably, they are based on an amorphous thermoplastic polymer and have a glass transition temperature Tg above the Tg of the thermoplastic polymer or polymer blend constituting the impregnation matrix when the latter is amorphous, or above the Tm of the thermoplastic polymer or polymer blend constituting the impregnation matrix when the latter is semicrystalline. Advantageously, they are based on a semicrystalline thermoplastic polymer and have a melting temperature Tm above the Tg of the thermoplastic polymer or polymer blend constituting the impregnation matrix when the latter is amorphous, or above the Tm of the thermoplastic polymer or polymer blend constituting the impregnation matrix when the latter is semicrystalline. Thus, there is no risk of melting for the organic fibers constituting the fibrous material during impregnation by the thermoplastic matrix of the final composite. Among the fibers of plant origin, mention may be made of natural fibers based on flax, hemp, lignin, bamboo, silk especially spider silk, sisal, and other cellulose fibers, in particular viscose fibers. These fibers of plant origin can be used pure, treated or else coated with a coating layer, for the purpose of facilitating the adhesion and impregnation of the thermoplastic polymer matrix.

The fibrous material may also be a fabric, braided or woven with fibers.

It may also correspond to fibers with support yarns.

These constituent fibers can be used alone or as mixtures. Thus, organic fibers can be mixed with mineral fibers in order to be impregnated with thermoplastic polymer and form the preimpregnated fibrous material.

The ravings of organic fibers may have several basis weights. They may also have several geometries. The fibers may be in the form of short fibers, which then make up felts or nonwovens that may be in the form of strips, sheets, or pieces, or in the form of continuous fibers, which make up 2D woven fabrics, braids or ravings of unidirectional (UD) fibers or nonwovens. The constituent fibers of the fibrous material may also be in the form of a mixture of these reinforcing fibers of various geometries. Preferably, the fibers are continuous.

Preferably the fibrous material is formed by continuous fibers of carbon, of glass or of silicon carbide or a mixture thereof, in particular carbon fibers. It is used in the form of a roving or several rovings.

In the preimpregnated materials that are also referred to as "ready to use" materials, the impregnating thermoplastic polymer or polymer blend is distributed uniformly and homogeneously around the fibers. In this type of material, the impregnating thermoplastic polymer must be distributed as homogenously as possible within the fibers in order to obtain a minimum amount of porosities, i.e. a minimum amount of voids between the fibers.

Specifically, the presence of porosities in materials of this type may act as points of stress concentrations, when placed under mechanical tensile stress for example, and which then form points of failure initiation of the preimpregnated fibrous material and mechanically weaken it. A homogeneous distribution of the polymer or polymer blend therefore improves the mechanical strength and the homogeneity of the composite material formed from these preimpregnated fibrous materials.

Thus, in the case of so have called "ready to use" preimpregnated materials, the content of fibers in said impregnated fibrous material is from 45% to 65% by volume, preferably from 50% to 60% by volume, especially from 54% to 60% by volume.

The measurement of the degree of impregnation may be carried out by image analysis (use of microscope or camera or digital camera, in particular) of a cross section of the tape, by dividing the surface area of the tape impregnated by the polymer by the total surface area of the product (impregnated surface area plus surface area of the porosities). In order to obtain a good quality image, it is preferable to coat the tape cut across its transverse direction with a standard polishing resin and to polish with a standard protocol enabling the observation of the sample with a microscope at at least six times magnification.

Advantageously, the degree of porosity of said preimpregnated fibrous material is between 0% and 30%, especially from 1% to 10%, in particular from 1% to 5%.

The degree of porosity corresponds to the degree of closed porosity and may be determined either by electron microscopy, or as being the relative deviation between the theoretical density and the experimental density of said preimpregnated fibrous material as described in the examples section of the present invention.

Impregnation Step:

An example of a unit for implementing the manufacturing process is described in international application WO 2015/121583 and as represented in FIG. 1 with the exception of the tank (otherwise referred to as the impregnation tank which in the case of the invention comprises a fluidized bed equipped with a tension device (FIG. 3) which may be a compression roller (FIG. 4)).

The compression roller may be fixed or rotary.

This step of impregnation of the fibrous material is carried out by passing one or more rovings through a continuous impregnation device, comprising a tank (20), comprising in particular a fluidized bed (22) of polymer powder.

The polymer powder or polymer is suspended in a gas G (air for example) introduced into the tank and flowing into the tank through a hopper 21. The roving(s) is (are) circulated through this fluidized bed 22.

The tank may have any shape, especially cylindrical or parailelepipedal, in particular rectangular parallelepiped or a cube, advantageously a rectangular parallelepiped.

The tank may be an open or closed tank. Advantageously, it is open.

In case where the tank is closed, it is then equipped with a sealing system so that the polymer powder cannot leave said tank.

This impregnation step is therefore carried out by a dry route, that is to say that the thermoplastic polymer matrix is in powder form, especially in suspension in a gas, in particular air, but cannot be in dispersion in a solvent or in water.

Each roving to be impregnated is unwound from a device (10) with reels (11) under the tension generated by rolls (not represented). Preferably, the device (10) comprises a plurality of reels (11), each reel making it possible to unwind one roving to be impregnated. Thus, it is possible to impregnate several fiber rovings simultaneously. Each reel (11) is provided with a break (not represented) so as to apply a tension to each fiber roving. In this case, an alignment module (12) makes it possible to position the fiber ravings parallel to one another.

In this way, the fiber ravings cannot be in contact with one another, which makes it possible to prevent a mechanical degradation of the fibers by rubbing against themselves.

The fiber roving or parallel fiber ravings then pass through a tank (20), comprising in particular a fluidized bed (22), provided with a tension device that is a compression roller (23) in the case of FIG. 1. The fiber roving or parallel fiber ravings then emerge from the tank after impregnation after controlling the residence time in the powder.

The inventors have therefore unexpectedly found that the control of the residence time in the powder made it possible to impregnate the fibrous material with the thermoplastic polymer matrix, with a well-controlled content of resin and homogeneously.

They also found that by means of the use of at least one tension device the impregnation was improved compared to the prior art processes, in particular the impregnation is full impregnation.

A tension device is understood to mean any system on which the roving has the possibility of running through the tank. The tension device may have any shape as long as the roving can run on it.

An example of attention device, without restricting the invention thereto, is given in detail in FIG. 3.

This impregnation is carried out in order to enable the polymer powder to penetrate to the core of the fiber roving and to adhere to the fibers sufficiently to withstand the transport of the powder coated roving out of the tank. The roving(s) preimpregnated by the powder is (are) then sent to a heated calendering device, with the possibility of preheating before calendering and optional post-calendering heating.

Optionally, this information step may be completed by a step of covering the pre-impregnated roving or ravings, right at the outlet of the tank (20) for impregnating with the powder in a fluidized bed (22), and right before the calendering shaping step. For this, the outlet airlock of the tank (20) (fluidized bed 22) may be connected to a covering device (30) that may comprise a covering crosshead, as is also described in patent EP 0 406 067. The covering polymer may be identical to or different from the fluidized bed polymer powder, Preferably, it is of the same type. Such coverage makes it possible not only to complete the step of impregnating the fibers in order to obtain a final volume content of polymer within the desired range and avoid the presence, at the surface of the preimpregnated roving, of a fiber content that is locally too high, which would be detrimental to the welding of the tapes during the manufacture of the composite part, especially for obtaining so-called "ready to use" fibrous materials of good quality, but also to improve the performance of the composite material obtained.

The process of the invention as indicated above is carried out by a dry route with exclusion of an electrostatic process with intentional charging.

The expression "with intentional charging" means that a potential difference is applied between the fibrous material and the powder. The charge is in particular controlled and amplified. The grains of powders then impregnate the fibrous material by attraction of the charged powder against the fiber. It is possible to electrically charge the powder, negatively or positively, by various means (potential difference between two metal electrodes, mechanical friction on metal parts, etc.) and to charge the fiber the opposite way (positively or negatively).

The process of the invention does not exclude the presence of electrostatic charges that might appear by friction of the fibrous material on the elements of the implementing unit before or in the tank but that are in any case unintentional charges.

Advantageously, the content of fibers in said impregnated fibrous material is from 45% to 65% by volume, preferably from 50% to 60% by volume, in particular from 54% to 60% by volume.

Below 45% of fibers, the reinforcement is insignificant as regards the mechanical properties. Above 65%, the limits of the process are reached and the mechanical properties are lost again.

If the fibrous material, such as the glass fiber, has a size, an optional de-sizing step may be carried out before the fibrous material passes into the tank. The term "size" denotes surface treatments applied to the reinforcing fibers on leaving the spinneret (textile size) and to the woven fabrics (plastic size).

The "textile" size applied to the filaments, on leaving the spinneret, consists in depositing a binding agent ensuring the cohesion of the filaments to one another, reducing abrasion and facilitating subsequent handling operations (weaving, drape forming, knitting) and preventing the formation of electrostatic charges.

The "plastic" size or "finish" applied to the woven fabrics consists in depositing a bridging agent, the roles of which are to ensure a physicochemical bond between the fibers in the resin and protect the fiber from its surroundings.

Advantageously, the content of fibers in said impregnated fibrous material is from 60% by volume, in particular from 54% to 60% by volume.

Advantageously, the residence time in the powder is from 0.01 s to 10 s, preferentially from 0.1 s to 5 s, and in particular from 0.1 s to 3 s.

The residence time of the fibrous material in the powder is essential for the impregnation, especially for impregnation, of said fibrous material.

Under 0.1 s, the impregnation is not right to the core.

Beyond 10 s, the amount of polymer matrix impregnating the fibrous material is too large and the mechanical properties of the preimpregnated fibrous material will be poor.

Advantageously, the tank used in the process of the invention comprises a fluidized bed and said impregnation step is carried out with simultaneous fanning out of said roving or of said ravings between the inlet and outlet of said fluidized bed.

The expression "inlet of the fluidized bed" corresponds to the vertical tangent of the edge of the tank which comprises the fluidized bed.

The expression "outlet of the fluidized bed" corresponds to the vertical tangent of the other edge of the tank which comprises the fluidized bed.

Depending on the juncture of the tank, but the distance in the inlet and the outlet thereof therefore corresponds to the diameter in the case of a cylinder, to the side in the case of a cube or to the width or length in the case of a rectangular parallelepiped. The fanning out consists in individualizing as much as possible each constituent filament of said roving from the other filaments that surround it in the closest space thereof. It corresponds to the transverse spreading of the roving.

In other words, the transfer spreading or the width of the moving increases between the inlet of the fluidized bed (or of the tank comprising the fluidized bed) and the outlet of the fluidized bed (or of the tank comprising the fluidized bed) and thus enables an improved impregnation, especially a full impregnation of the fibrous material.

The fluidized bed may be open or closed, in particular it is open.

Advantageously, the said fluidized bed comprises at least one tension device, said roving or said rovings being in contact with a portion or the whole of the surface of said at least one tension device.

FIG. 3 gives details of a tank (20) comprising a fluidized bed (22) with a height-adjustable tension device (82).

The roving (81a) corresponds to the roving before impregnation which is in contact with a portion or the whole of the surface of said at least one tension device and therefore runs partially or completely over the surface of the tension device (82), said system (82) being immersed in the fluidized bed where the impregnation is carried out. Said roving then emerges from the tank (81b) after controlling the residence time in the powder.

Said roving (81a) may or may not be in contact with the edge of the tank (83a) which may be a rotary or fixed roller or a parallelepipedal edge.

Advantageously, said roving (81a) is optionally in contact with the edge of the tank (83a). Advantageously, the edge of the tank (83b) is a roller, in particular a cylindrical and rotary roller.

Said roving (81b) may or may not be in contact with the edge of the tank (83b) which may be a roller, in particular a cylindrical and rotary or fixed roller, or a parallelepipedal edge.

Advantageously, said roving (81b) is in contact with the edge of the tank (83b).

Advantageously, the edge of the tank (83b) is a roller, in particular a cylindrical and rotary roller.

Advantageously, said roving (81a) is in contact with the edge of the tank (83a) and the edge of the tank (83b) is a roller, in particular a cylindrical and rotary roller and said roving (81b) is in contact with the edge of the tank (83b), and the edge of the tank (83b) is a roller, in particular a cylindrical and rotary roller.

Advantageously, said tension device is perpendicular to the direction of said roving or of said ravings.

Advantageously, said fanning out of said roving or of said ravings is carried out at least level with said at least one tension device.

The fanning out of the roving is therefore mainly carried out level with the tension device but may also be carried out level with the edge or edges of the tank if there is contact between the roving and said edge.

In another embodiment, said at least one tension device is a compression roller of convex, concave or cylindrical shape.

The convex shape is favorable to the fanning out as the concave shape is unfavourable to the fanning out although it is nevertheless carried out.

The expression "compression roller" means that the roving that is running presses partially or completely against the surface of said compression roller, which induces the fanning out of said roller.

Advantageously, said at least one compression roller is of cylindrical shape and the percentage of fanning out of said roving or of said ravings between the inlet and the outlet of said fluidized bed is from 1% to 400%, preferentially between 30% and 400%, preferentially between 30% and 150%, preferentially between 50% and 150%.

The fanning out is a function of the fibrous material used. For example, the fanning out of a carbon fiber material is much greater than that of a flax fiber.

The fanning out is also a function of the number of fibers or filaments in the roving, on their mean diameter and on their cohesion by virtue of the size.

The diameter of said at least one compression roller is from 3 mm to 500 mm, preferentially from 10 mm to 100 mm, in particular from 20 mm to 60 mm.

Below 3 mm, the deformation of the fiber induced by the compression roller is too large. Advantageously, the compression roller is cylindrical and non-grooved and in particular is metallic.

When the tension device is at least one compression roller, according to a first variant, a single compression roller is present in the fluidized bed and said impregnation is carried out at the angle ci formed by said roving or said rovings between the start of said compression roller and the vertical tangent to said compression roller.

The angle $\alpha_1$ formed by said roving or said rovings between the start of said compression roller and the vertical tangent to said compression roller enables the formation of a zone in which the powder will concentrate thus resulting in a "corner effect" which with the simultaneous fanning out of the roving by said compression roller enables an impregnation over a greater roving width and therefore an improved impregnation compared to the prior art techniques that is improved. Coupling with the controlled residence time then enables a full impregnation.

Advantageously, the angle $\alpha_1$ is from 0 to 89°, preferentially 5° to 85°, preferentially from 5° to 45°, preferentially from 5° to 30°.

However, an angle $\alpha_1$ of from 0 to 5° is capable of generating risks of mechanical stress, which will result in the breakage of the fibers and an angle $\alpha_1$ of from 85° to 89° does not create enough mechanical stress to create "the corner effect".

A value of the angle $\alpha_1$ equal to 0° therefore corresponds to a vertical fiber. It is quite obvious that the height of the cylindrical compression roller is adjustable thus making it possible to be able to position the fiber vertically.

It would not be outside the scope of the invention for the wall of the tank to be pierced so as to be able to allow the roving to leave.

Advantageously, the edge of the tank (83a) is equipped with a roller, in particular a cylindrical and rotary roller on which said roving or said rovings run(s) thus resulting in a prior fanning out.

Advantageously, one or more tension devices are present downstream of the tank comprising the fluidized bed, on which tension device(s) the fanning out is initiated.

Advantageously, the fanning out is initiated on said tension device(s) defined above and continues on the edge of the tank (83a).

The fanning out is then at a maximum after passing over the compression roller(s).

FIG. 4 describes an embodiment, without being limited thereto, having a single compression roller, with a tank (20) comprising a fluidized bed (22) in which a single cylindrical compression roller is present and showing the angle $\alpha_1$.

The arrows on the fiber indicate the run direction of the fiber.

Advantageously, the level of said powder in said fluidized bed is at least located halfway up said compression roller.

It is quite obvious that the "corner effect" caused by the angle $\alpha_1$ favors the impregnation on one face but the fanning out of said roving obtained by means of the compression roller also makes it possible to have an impregnation on the other face of said roving. In other words, said impregnation is favored on one face of said roving or of said ravings at the angle $\alpha_1$ formed by said roving or said ravings between the start of said at least one compression roller $R_1$ and the vertical tangent to the compression roller $R_1$ but the fanning out also makes it possible to impregnate the other face.

The angle cui is as defined above.

According to a second variant, when the tension device is at least one compression roller, then two compression rollers $R_1$ and $R_2$ are in said fluidized bed and said impregnation is carried out at the angle $\alpha_1$ formed by said roving or said rovings between the start of said compression roller $R_1$ and the vertical tangent to said compression roller $R_1$ and/or at the angle $\alpha_2$ formed by said roving or said rovings between the start of said compression roller $R_2$ and the vertical tangent to said compression roller $R_2$, said compression roller $R_1$ preceding said compression roller $R_2$ and said roving or said ravings being able to pass on top of (FIGS. 5a 6) or underneath (FIGS. 7 and 8) the roller $R_2$.

Advantageously, the two compression rollers are of identical or different shape, chosen from a convex, concave or cylindrical shape.

Advantageously, the two compression rollers are identical and non-grooved cylindrical rollers and in particular are metallic.

The diameter of the two compression rollers may also be identical or different and is as defined above.

Advantageously, the diameter of the two compression rollers is identical.

The two compression rollers $R_1$ and $R_2$ may be at the same level relative to one another and relative to the bottom of the tank (FIGS. 6 and 7) or offset relative to one another and relative to the bottom of the tank, the height of the compression roller $R_1$ being greater than or less than that of the compression roller $R_2$ relative to the bottom of the tank (FIGS. 5 and 8). Advantageously, when the two rollers are at different heights and when the roving passes on top of the roller $R_2$, then $\alpha_2$ is from 0 to 90°.

Advantageously, said impregnation is therefore carried out at the angle $\alpha_1$ formed by said roving or said ravings between the start of said compression roller $R_1$ and the vertical tangent to said compression roller on one face of said roving and at the angle $\alpha_2$ formed by said roving or said ravings between the start of said compression roller $R_2$ and the vertical tangent to said compression roller $R_2$ on the opposite face of said roving which is obtained by passing on top of roller $R_2$.

Advantageously, said roving in this embodiment is subject to a fanning out at each angle $\alpha_1$ and $\alpha_2$.

FIG. 6 describes an embodiment, without being limited thereto, having two compression rollers $R_1$ and $R_2$. $R_1$ preceding $R_2$, with a tank (20) comprising a fluidized bed (22) in which the two cylindrical compression rollers, at the same level and side-by-side, are present and showing the case where said roving(s) emerge(s) between said compression rollers $R_1$ and $R_2$.

In this case, the angle $\alpha_2$ is equal to 0 and said roving(s) pass(es) over the roller $R_2$.

The arrows on the fiber indicate the run direction of the fiber.

Alternatively, said roving or said rovings run(s) at the start between said compression rollers $R_1$ and $R_2$ and emerge(s) after having been in contact with a portion or the whole of the surface of said compression roller $R_2$.

Advantageously, said roving or said rovings is (are) in contact at the start with a portion or the whole of the surface of said compression roller $R_1$ and emerge(s) on the outside of the compression roller $R_2$ after having been in contact with a portion or the whole of the surface of said compression roller $R_2$, underneath the roller $R_2$, the angle $\alpha_2$ being formed by said roving or said rovings between the start of said compression roller $R_2$ and the vertical tangent to said compression roller $R_2$. In this case, the angle $\alpha_2=90°$.

Said impregnation is therefore carried out at the angle $\alpha_1$ formed by said roving or said ravings between the start of said compression roller $R_1$ and the vertical tangent to said compression roller on one face of said roving and at the angle $\alpha_2$ formed by said roving or said ravings between the start of said compression roller $R_2$ and the vertical tangent to said compression roller $R_2$ on the same face of said roving but the fanning out also makes it possible to impregnate the other face.

Advantageously, said roving in this embodiment is subject to a fanning out at each angle $\alpha_1$ and $\alpha_2$.

FIG. 7 presents an exemplary embodiment with two compression rollers $R_1$ and $R_2$ at the same level relative to one another.

According to another embodiment of the second variant, when two compression rollers are present then the distance between the two compression rollers $R_1$ and $R_2$ is from 0.15 mm to the length equivalent to the maximum dimension of the tank, preferentially from 10 mm to 50 mm and the difference in height between the two compression rollers $R_1$ and $R_2$ is from 0 to the height corresponding to the maximum height of the tank minus the diameters of the two compression rollers, preferentially from 0.15 mm to the height corresponding to the maximum height of the tank minus the diameters of the two compression rollers, more preferentially to a height difference between 10 mm and 300 mm, $R_2$ being the upper compression roller.

Advantageously, when two compression rollers are present and at the same level relative to one another, the level of said powder in said fluidized bed is at least located halfway up said two compression rollers.

FIG. 8 describes an embodiment, without being limited to thereto, having two compression rollers $R_1$ and $R_2$, $R_1$ preceding $R_2$, with a tank (20) comprising a fluidized bed (22) in which the two cylindrical compression rollers at different levels are present and showing the angles $\alpha_1$ and $\alpha_2$.

The diameter of the compression rollers $R_1$ and $R_2$ is presented as identical in FIGS. 5, 6, 7 and 8 but the diameter of each cylindrical compression roller may be different, the diameter of the compression roller $R_1$ possibly being greater than or less than that of the compression roller $R_2$ within the range as defined above.

Advantageously, the diameter of the two compression rollers is identical.

It would not be outside the scope of the invention for the compression roller $R_1$ to be higher than the compression roller $R_2$.

According to a third variant, when two compression rollers are present and are at different levels, then at least one third of compression roller $R_3$ is furthermore present and located between the compression rollers $R_1$ and $R_2$ in the height direction (FIG. 9).

Advantageously, said roving or said rovings is (are) in contact at the start with a portion or the whole of the surface of said compression roller $R_1$ then with a portion or the whole of the surface of said compression roller $R_3$ and emerge(s) after having been in contact with a portion or the whole of the surface of said compression roller $R_2$.

Advantageously, said impregnation is therefore carried out on one face of said roving or of said rovings at the angle $\alpha_1$ formed by said roving or said rovings between the start of said at least one compression roller $R_1$ and the vertical tangent to the compression roller $R_1$ and also at the angle $\alpha_3$ formed by said roving or said rovings and the vertical tangent to the compression roller $R_3$ and on the other face at the angle $\alpha_2$ formed by said roving or said rovings and the vertical tangent to the compression roller $R_2$.

Advantageously, when two compression rollers are present at different levels and when at least one third compression roller $R_3$ is furthermore present, then the angle $\alpha_2$ formed by said roving or said ravings between the start of said at least one compression roller $R_2$ and the vertical tangent to said compression roller $R_2$ is from 180° to 45°, in particular from 120° to 60°.

Advantageously, the angle $\alpha_3$ is from 0° to 180°, advantageously from 45° to 135°.

FIG. 9 describes an embodiment, without being limited to thereto, with a tank (20) comprising a fluidized bed (22) having two compression rollers $R_1$ and $R_2$, $R_1$ preceding $R_2$, and a third compression roller $R_3$ and showing the angles $\alpha_1$, $\alpha_2$ and $\alpha_3$.

The diameter of the compression rollers $R_1$, $R_2$ and $R_3$ is presented as identical in FIG. 9 but the diameter of each cylindrical compression roller may be different, or to compression rollers may have the same diameter and the third a different, greater or smaller, diameter, within the range as defined above.

Advantageously, the diameter of the three compression rollers is identical.

Advantageously, in this third variant, a second control of the fanning out of said roving or of said rovings is carried out at the compression roller $R_3$ and a third control of the fanning out is carried out at the compression roller $R_3$.

The residence time in this third variant is as defined above.

Advantageously, in this third variant, the level of said powder in said fluidized bed is at least located halfway up said compression roller $R_2$.

It would not be outside the scope of the invention, in this third variant, for said roving or said rovings to be in contact at the start with a portion or the whole of the surface of said compression roller $R_1$ then with a portion or the whole of the surface of said compression roller $R_2$ and to emerge after having been in contact with a portion or the whole of the surface of said compression roller $R_3$.

According to one advantageous embodiment, the present invention relates to a process as defined above characterized in that a single thermoplastic polymer matrix is used and the thermoplastic polymer powder is fluidizable.

The term "fluidizable" means that the flow rate of air applied to the fluidized bed is between the minimum fluidizing flow rate (Umf) and the minimum bubbling flow rate (Umf) as represented in FIG. 16.

Below the minimum fluidizing flow rate there is no fluidisation, the particles of polymer powder fall in the bed and are no longer in suspension and the process according to the invention cannot operate.

Above the minimum bubbling flow rate, the powder particles flyway and the constant composition of the fluidized bed can no longer be kept constant.

Advantageously, the volume diameter D90 of the particles is from 50 to 500 µm, advantageously from 120 to 300 µm.

Advantageously, the volume diameter D10 of the particles is from 5 to 200 µm, advantageously from 35 to 100 µm.

Advantageously, the volume diameter of the powder particles is within the ratio D90/D10, i.e. from 1.5 to 50, advantageously from 2 to 10.

Advantageously, the volume mean diameter D50 of the thermoplastic polymer powder particles is from 30 to 300 µm, in particular from 50 to 200 µm, more particularly from 70 to 200 µm.

The volume diameters of the particles (D10, D50 and D90) are defined according to the standard ISO 9276: 2014.

"D50" corresponds to the volume mean diameter, that is to say the value of the particle size which divides the population of particles examined exactly into two.

"D90" corresponds to the value at 90% of the combined curve of the volume particle size distribution.

"D10" corresponds to the corresponds to the size of 10% of the volume of the particles.

According to another embodiment of the process according to the invention, a creel is present before the tank comprising a fluidized bed for controlling the tension of said roving or of said ravings at the inlet to the tank comprising a fluidized bed.

Optionally, in the process according to invention, one or more tension devices are present after the tank comprising the fluidized bed.

Shaping Step

As soon as it (they) leave the tank (20), in particular comprising a fluidized bed (22), the preimpregnated roving (parallel ravings), optionally covered with a molten polymer, is (are) shaped in the form of a single unidirectional tape or of a plurality of parallel unidirectional tapes, by means of a continuous calendering device comprising one or more heated calandars.

Advantageously, the heated calenciers of the calendering device are coupled to rapid heating means that make it possible to heat the material not only at the surface but also at the core.

The fanned-out roving leaving the tank (20) comprising a fluidized bed (22) then retracts under the effect of the heating which helps to insert the molten polymer between the fibers of the roving thus make it possible to reduce the paucity of said roving and favoring and impregnation, in particular for impregnation, of said roving.

The mechanical stress of the calenders coupled to these rapid heating means makes it possible to eliminate the presence of porosities and to homogeneously distribute the polymer, especially when the fibrous material is a so-called ready to use material.

Advantageously, this hot calendering makes it possible not only to heat the impregnation polymer so that it uniformly penetrates, adheres to and covers the fibers, but also to control the thickness and the width of the tape(s) of preimpregnated fibrous material.

In order to be able to produce a plurality of parallel unidirectional tapes, i.e. as many tapes as preimpregnated parallel rovings, passed through the fluidized bed, the heated calenders, referenced (51), (52), (53) in the diagram of FIG. 1, advantageously comprise a plurality of calendering grooves (73), in accordance with the number of tapes. This number of grooves may for example range up to 200. A servo control system SYST further makes it possible to regulate the pressure and/or the spacing E between the rollers (71), (75) of the calender (70), so as to control the thickness ep of the tapes. Such a calender (70) is depicted in FIG. 2 described below.

The calendering device comprises at least one heated calender (51). Preferably, it comprises several heated calenders (51), (52), (53) mounted in parallel and/or in series relative to the run direction of the fiber rovings.

In particular, the successor calendering step is carried out progressively with pressures between the rollers that are increasing (in the run direction of the process) and/or a spacing between the rollers which decreases (in the run direction of the process).

The fact of having several calenders in series makes it possible to compact the material and reduce the amount of porosities in the material and reduce the degree thereof. This plurality of calenders is therefore important when it is desired to produce so-called "ready to use" fibrous materials.

The fact of having several calendars in parallel makes it possible to increase the number of preimpregnated ravings.

Advantageously, each calender of the calendering device has an integrated induction or microwave heating system, preferably microwave heating system, in order to heat the thermoplastic polymer a polymer blend. Advantageously, when the polymer or polymer blend comprises carbon-based fillers, such as carbon black or carbon-based nano fillers, preferably chosen from carbon-based nano fillers, in particular graphenes and/or carbon nanotubes and/or carbon nanofibrils or mixtures thereof, the induction microwave heating effect is amplified by the presence of these fillers that then conduct heat to the core of the material.

Advantageously, each calender (51), (52), (53) of the device is coupled to a rapid heating device (41), (42), (43), located before and/or after each calender, in order to rapidly transmit thermal energy to the material and to perfect the impregnation of the fibers by the molten polymer. The rapid heating device may for example be chosen from the following devices: a microwave or induction device, an infrared IR or laser device or another device that enables by direct contact with the heat source such as a flame or hot gas device. A microwave or induction device is very advantageous, in particular when it is coupled to the presence of carbon-based nanofillers in the polymer or polymer blend since the carbon-based nanofillers amplify the heating effect and transmit it to the core of the material.

According to one embodiment variant, it is further possible to combine several of these heating devices.

The process may further comprise a step of heating the fiber ravings before said impregnation with, as preferred heating means, microwave heating like for the heating system of said heated calender.

Optionally, a subsequent step consists in winding up the preimpregnated and shaped tape(s).

For this, the unit (100) for implementing the process comprises a winding device (60) comprising as many reels (61) as tapes, one reel (61) being assigned to each tape. A distributor (62) is in general provided in order to divert the preimpregnated tapes to their respective reels (61), while preventing the tapes from touching in order to avoid any degradation.

FIG. 2 depicts the detail of the grooves (73) of a calender (70) seen in cross section. A calender (70) comprises an upper roller (71) and a lower roller (75). One of the rollers, for example the upper roller (71), comprises a toothed portion (72), whereas the other roller, that is to say the lower roller (75) in the example, comprises a grooved portion (76), the shape of the grooves being complementary to the shape of the protruding portions (72) of the upper roller. The spacing E between the rollers (71), (75) and/or the pressure exerted by the two rollers against one another, makes it possible to define the dimensions of the grooves (73), and especially their thickness ep and width 1. Each groove (73) is provided in order to house therein a fiber roving which is then pressed and heated between the rollers. The rovings are then converted into parallel unidirectional tapes, the thickness and width of which are calibrated by the grooves (73) of the calenders. Each calender advantageously comprises a plurality of grooves, the number of which may range up to 200, so as to produce as many tapes as there are grooves and preimpregnated rovings. The calendering device may further comprise a central device, referenced SYST in FIG. 1, controlled by a computer program provided for this purpose, which makes it possible to simultaneously regulate the pressure and/or the spacing of the calendering rollers of all the calenders of the unit 100.

The unidirectional tape(s) thus manufactured has (have) a width l and a thickness ep that are suitable for robotic layup in the manufacture of three-dimensional parts, with no need for slitting to the correct width. The width of the tape(s) is advantageously between 5 and 400 mm, preferably between 5 and 50 mm and even more preferably between 5 and 15 mm. The process for manufacturing a preimpregnated fibrous material that has just been described therefore makes it possible to produce preimpregnated fibrous materials with a high productivity, while enabling a homogeneous impregnation of the fibers and the control and reproducibility of the porosity, thus enabling the control and reproducibility of the performance of the targeted final composite article. The homogeneous impregnation around the fibers and the absence of porosities are ensured by the impregnation step in the tank by control of the residence time in said powder, especially a tank comprising a fluidized bed, and "corner effect", coupled with the simultaneous fanning out of the roving on the compression roller(s). The materials obtained are semifinished products in the form of tapes that are calibrated in terms of thickness and width, and that have a low porosity.

The process therefore makes it possible to produce calibrated tapes of preimpregnated fibrous material that are suitable for the manufacture of three-dimensional composite parts, by automated layup of said tapes using a robot.

Advantageously, the thermoplastic polymer of the tape obtained with the process according to the invention is selected from amorphous polymers having a glass transition temperature such that $Tg \geq 80°$ C. and/or from semicrystalline polymers having a melting temperature $Tm \geq 150°$ C.

Advantageously, said thermoplastic polymer is:
an aliphatic polyamide chosen from polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), blends thereof or copolymers thereof, in particular 1010/11, 1010/12 etc.
an aromatic polyamide, optionally modified by urea moieties, in particular a polyphthalamide, especially a semiaromatic polyamide of formula X/YAr, as described in EP 1 505 099, especially a semiaromatic polyamide of formula A/XT in which A is chosen from a moiety obtained from an amino acid, a moiety obtained from a lactam and a moiety corresponding to the formula (Ca diamine)·(Cb diacid), with a representing the number of carbon atoms of the diamine and b representing the number of carbon atoms of the diacid, a and b each being between 4 and 36, advantageously between 9 and 18;

X.T denotes a moiety obtained from the polycondensation of a Cx diamine and terephthalic acid, with x representing the number of carbon atoms of the Cx diamine, x being between 6 and 36, advantageously between 9 and 18, especially a polyamide of formula A/6T, A/9T, A/10T or A/11T, A being as defined above, in particular a polyamide PA 6/6T, 66/6T, 6I/6T, PA11/10T, 11/6T/10T, MXDT/10T or MPMDT/10T, BACT/10T aramid, and block copolymers, especially polyamide/polyether (PEBA).

Advantageously, the fibrous material of the tape obtained with the process according to the invention is made of carbon fiber.

Advantageously, the thermoplastic polymer of the tape obtained with the process according to the invention is a semi aromatic polyamide, especially chosen from PA 11, PA 12, PA 11/1010, PA 12/1010, PA 11/10T, PA 11/6T/10T, PA MXDT/10T, PA MPMDT/10T and PA BACT/10T and the fibrous material of the tape obtained with the process according to the invention is made of carbon fiber.

Advantageously, said tape, the thermoplastic polymer of which is a polyamide chosen from PA 11, PA 12, PA 11/1010, PA 12/1010, PA 11/10T, PA 11/6T/10T, PA MXDT/10T, PA MPMDT/10T and PA BACT/10T, is used for civil or military aeronautics or the automotive industry.

Advantageously, the thermoplastic polymer of the tape obtained with the process according to the invention is PEKK.

Advantageously, the fibrous material of the tape obtained with the process according to the invention is made of carbon fiber.

Advantageously, the thermoplastic polymer of the tape obtained with the process according to the invention is PEKK and the fibrous material of the tape obtained with the process according to the invention is made of carbon fiber.

Advantageously, the thermoplastic polymer of the tape obtained with the process according to the invention is PEI.

Advantageously, the fibrous material of the tape obtained with the process according to the invention is made of carbon fiber.

Advantageously, the thermoplastic polymer of the tape obtained with the process according to the invention is PEI and the fibrous material of the tape obtained with the process according to the invention is made of carbon fiber.

Advantageously, the thermoplastic polymer of the tape obtained with the process according to the invention is a blend of PEKK and PEI, preferably 90-10% to 60-40% by weight, in particular from 90-10% to 70-30% by weight.

Advantageously, the fibrous material of the tape obtained with the process according to the invention is made of carbon fiber.

Advantageously, the thermoplastic polymer of the tape obtained with the process according to the invention is a blend of PEKK and PEI and the fibrous material of the tape obtained with the process according to the invention is made of carbon fiber.

According to another aspect, the present invention relates to the use of the tape of preimpregnated fibrous material, as defined above, in the manufacture of three-dimensional composite parts.

Advantageously, said manufacture of said composite parts relates to the fields of transport, in particular motor vehicle transport, of oil and gas, in particular offshore, of gas storage, civil or military aeronautical, nautical and railroad transport; of renewable energy, in particular wind turbine or marine turbine, energy storage devices, solar panels; thermal protection panels; sports and leisure, health and medical, ballistics with weapon or missile parts, safety and electronics.

According to yet another aspect, the present invention relates to a three-dimensional composite part, characterized in that it results from the use of at least one unidirectional tape of preimpregnated fibrous material as defined above.

Advantageous Embodiments of the Process of the Invention

Advantageously, the fibrous material is chosen from carbon fiber and glass fiber.

Advantageously, the thermoplastic polymer used to impregnate the carbon fiber is chosen from a polyamide, especially an aliphatic polyamide such as PA 11, PA 12, PA 11/1010 or PA 12/1010, or a semiaromatic polyamide, in particular a PA 11/10T, a PA 11/6T/10T, a PA MXDT/10T or a PA MPMDT/10T, or PA BACT/10T, a PEKK and a PEI or a mixture thereof.

Advantageously, the thermoplastic polymer used to impregnate the glass fiber is chosen from a polyamide, especially an aliphatic polyamide such as PA 11, PA 12, PA 11/1010 or PA 12/1010, or a semiaromatic polyamide, in particular a PA 11/10T, a PA 11/6T/10T, a PA MXDT/10T, a PA MPMDT/10T, or PA BACT/10T, a PEKK and a PEI or a mixture thereof.

Advantageously, the content of fibers in said impregnated fibrous material, formed of carbon fiber or glass fiber, is from 45% to 65% by volume, preferably from 50% to 60% by volume, in particular from 54% to 60% by volume.

Table 1 below brings together advantageous embodiments according to the process of the invention carried out in a tank comprising a fluidized bed for a roving made of carbon fiber or of glass fiber with one or more non-grooved cylindrical compression rollers:

TABLE I

| Embodiment no. | Fibrous material (fibers of . . . ) | Polymer | Number of compression rollers | Residence time (s) | Angle $\alpha_1$ (°) |
|---|---|---|---|---|---|
| 1 | Carbon | Polyamide | 1 | 0.1 to 5 | 5 to 85 |
| 2 | Carbon | Polyamide | 1 | 0.1 to 5 | 5 to 45 |
| 3 | Carbon | Polyamide | 1 | 0.1 to 5 | 5 to 30 |
| 4 | Carbon | Polyamide | 1 | 0.1 to 3 | 5 to 85 |
| 5 | Carbon | Polyamide | 1 | 0.1 to 3 | 5 to 45 |
| 6 | Carbon | Polyamide | 1 | 0.1 to 3 | 5 to 30 |
| 7 | Carbon | Polyamide | 2 | 0.1 to 5 | 5 to 85 |
| 8 | Carbon | Polyamide | 2 | 0.1 to 5 | 5 to 45 |
| 9 | Carbon | Polyamide | 2 | 0.1 to 5 | 5 to 30 |
| 10 | Carbon | Polyamide | 2 | 0.1 to 3 | 5 to 85 |
| 11 | Carbon | Polyamide | 2 | 0.1 to 3 | 5 to 45 |
| 12 | Carbon | Polyamide | 2 | 0.1 to 3 | 5 to 30 |
| 13 | Carbon | Polyamide | 3 | 0.1 to 5 | 5 to 85 |
| 14 | Carbon | Polyamide | 3 | 0.1 to 5 | 5 to 45 |
| 15 | Carbon | Polyamide | 3 | 0.1 to 5 | 5 to 30 |
| 16 | Carbon | Polyamide | 3 | 0.1 to 3 | 5 to 85 |
| 17 | Carbon | Polyamide | 3 | 0.1 to 3 | 5 to 45 |
| 18 | Carbon | Polyamide | 3 | 0.1 to 3 | 5 to 30 |
| 19 | Carbon | PEKK | 1 | 0.1 to 5 | 5 to 85 |
| 20 | Carbon | PEKK | 1 | 0.1 to 5 | 5 to 45 |
| 21 | Carbon | PEKK | 1 | 0.1 to 5 | 5 to 30 |
| 22 | Carbon | PEKK | 1 | 0.1 to 3 | 5 to 85 |
| 23 | Carbon | PEKK | 1 | 0.1 to 3 | 5 to 45 |
| 24 | Carbon | PEKK | 1 | 0.1 to 3 | 5 to 30 |
| 25 | Carbon | PEKK | 2 | 0.1 to 5 | 5 to 85 |
| 26 | Carbon | PEKK | 2 | 0.1 to 5 | 5 to 45 |
| 27 | Carbon | PEKK | 2 | 0.1 to 5 | 5 to 30 |
| 28 | Carbon | PEKK | 2 | 0.1 to 3 | 5 to 85 |
| 29 | Carbon | PEKK | 2 | 0.1 to 3 | 5 to 45 |
| 30 | Carbon | PEKK | 2 | 0.1 to 3 | 5 to 30 |
| 31 | Carbon | PEKK | 3 | 0.1 to 5 | 5 to 85 |
| 32 | Carbon | PEKK | 3 | 0.1 to 5 | 5 to 45 |
| 33 | Carbon | PEKK | 3 | 0.1 to 5 | 5 to 30 |
| 34 | Carbon | PEKK | 3 | 0.1 to 3 | 5 to 85 |
| 35 | Carbon | PEKK | 3 | 0.1 to 3 | 5 to 45 |
| 36 | Carbon | PEKK | 3 | 0.1 to 3 | 5 to 30 |
| 37 | Carbon | PEI | 1 | 0.1 to 5 | 5 to 85 |
| 38 | Carbon | PEI | 1 | 0.1 to 5 | 5 to 45 |
| 39 | Carbon | PEI | 1 | 0.1 to 5 | 5 to 30 |
| 40 | Carbon | PEI | 1 | 0.1 to 3 | 5 to 85 |
| 41 | Carbon | PEI | 1 | 0.1 to 3 | 5 to 45 |
| 42 | Carbon | PEI | 1 | 0.1 to 3 | 5 to 30 |
| 43 | Carbon | PEI | 2 | 0.1 to 5 | 5 to 85 |
| 44 | Carbon | PEI | 2 | 0.1 to 5 | 5 to 45 |
| 45 | Carbon | PEI | 2 | 0.1 to 5 | 5 to 30 |
| 46 | Carbon | PEI | 2 | 0.1 to 3 | 5 to 85 |
| 47 | Carbon | PEI | 2 | 0.1 to 3 | 5 to 45 |
| 48 | Carbon | PEI | 2 | 0.1 to 3 | 5 to 30 |
| 49 | Carbon | PEI | 3 | 0.1 to 5 | 5 to 85 |
| 50 | Carbon | PEI | 3 | 0.1 to 5 | 5 to 45 |
| 51 | Carbon | PEI | 3 | 0.1 to 5 | 5 to 30 |
| 52 | Carbon | PEI | 3 | 0.1 to 3 | 5 to 85 |
| 53 | Carbon | PEI | 3 | 0.1 to 3 | 5 to 45 |
| 54 | Carbon | PEI | 3 | 0.1 to 3 | 5 to 30 |
| 55 | Carbon | PEI | 1 | 0.1 to 5 | 5 to 85 |
| 56 | Carbon | PEI | 1 | 0.1 to 5 | 5 to 45 |
| 57 | Carbon | PEI | 1 | 0.1 to 5 | 5 to 30 |
| 58 | Carbon | PEI | 1 | 0.1 to 3 | 5 to 85 |
| 59 | Carbon | PEI | 1 | 0.1 to 3 | 5 to 45 |
| 60 | Carbon | PEI | 1 | 0.1 to 3 | 5 to 30 |
| 61 | Carbon | PEI | 2 | 0.1 to 5 | 5 to 85 |
| 62 | Carbon | PEI | 2 | 0.1 to 5 | 5 to 45 |
| 63 | Carbon | PEI | 2 | 0.1 to 5 | 5 to 30 |
| 64 | Carbon | PEI | 2 | 0.1 to 3 | 5 to 85 |
| 65 | Carbon | PEI | 2 | 0.1 to 3 | 5 to 45 |
| 66 | Carbon | PEI | 2 | 0.1 to 3 | 5 to 30 |
| 67 | Carbon | PEI | 3 | 0.1 to 5 | 5 to 85 |
| 68 | Carbon | PEI | 3 | 0.1 to 5 | 5 to 45 |
| 69 | Carbon | PEI | 3 | 0.1 to 5 | 5 to 30 |
| 70 | Carbon | PEI | 3 | 0.1 to 3 | 5 to 85 |
| 71 | Carbon | PEI | 3 | 0.1 to 3 | 5 to 45 |
| 72 | Carbon | PEI | 3 | 0.1 to 3 | 5 to 30 |
| 73 | Glass | Polyamide | 1 | 0.1 to 5 | 5 to 85 |
| 74 | Glass | Polyamide | 1 | 0.1 to 5 | 5 to 45 |
| 75 | Glass | Polyamide | 1 | 0.1 to 5 | 5 to 30 |
| 76 | Glass | Polyamide | 1 | 0.1 to 3 | 5 to 85 |
| 77 | Glass | Polyamide | 1 | 0.1 to 3 | 5 to 45 |
| 78 | Glass | Polyamide | 1 | 0.1 to 3 | 5 to 30 |
| 79 | Glass | Polyamide | 2 | 0.1 to 5 | 5 to 85 |
| 80 | Glass | Polyamide | 2 | 0.1 to 5 | 5 to 45 |
| 81 | Glass | Polyamide | 2 | 0.1 to 5 | 5 to 30 |
| 82 | Glass | Polyamide | 2 | 0.1 to 3 | 5 to 85 |
| 83 | Glass | Polyamide | 2 | 0.1 to 3 | 5 to 45 |
| 84 | Glass | Polyamide | 2 | 0.1 to 3 | 5 to 30 |
| 85 | Glass | Polyamide | 3 | 0.1 to 5 | 5 to 85 |
| 86 | Glass | Polyamide | 3 | 0.1 to 5 | 5 to 45 |
| 87 | Glass | Polyamide | 3 | 0.1 to 5 | 5 to 30 |
| 88 | Glass | Polyamide | 3 | 0.1 to 3 | 5 to 85 |
| 89 | Glass | Polyamide | 3 | 0.1 to 3 | 5 to 45 |

TABLE I-continued

| Embodiment no. | Fibrous material (fibers of . . .) | Polymer | Number of compression rollers | Residence time (s) | Angle $\alpha_1$ (°) |
|---|---|---|---|---|---|
| 90 | Glass | Polyamide | 3 | 0.1 to 3 | 5 to 30 |
| 91 | Glass | PEKK | 1 | 0.1 to 5 | 5 to 85 |
| 92 | Glass | PEKK | 1 | 0.1 to 5 | 5 to 45 |
| 93 | Glass | PEKK | 1 | 0.1 to 5 | 5 to 30 |
| 94 | Glass | PEKK | 1 | 0.1 to 3 | 5 to 85 |
| 95 | Glass | PEKK | 1 | 0.1 to 3 | 5 to 45 |
| 96 | Glass | PEKK | 1 | 0.1 to 3 | 5 to 30 |
| 97 | Glass | PEKK | 2 | 0.1 to 5 | 5 to 85 |
| 98 | Glass | PEKK | 2 | 0.1 to 5 | 5 to 45 |
| 99 | Glass | PEKK | 2 | 0.1 to 5 | 5 to 30 |
| 100 | Glass | PEKK | 2 | 0.1 to 3 | 5 to 85 |
| 101 | Glass | PEKK | 2 | 0.1 to 3 | 5 to 45 |
| 102 | Glass | PEKK | 2 | 0.1 to 3 | 5 to 30 |
| 103 | Glass | PEKK | 3 | 0.1 to 5 | 5 to 85 |
| 104 | Glass | PEKK | 3 | 0.1 to 5 | 5 to 45 |
| 105 | Glass | PEKK | 3 | 0.1 to 5 | 5 to 30 |
| 106 | Glass | PEKK | 3 | 0.1 to 3 | 5 to 85 |
| 107 | Glass | PEKK | 3 | 0.1 to 3 | 5 to 45 |
| 108 | Glass | PEKK | 3 | 0.1 to 3 | 5 to 30 |
| 109 | Glass | PEI | 1 | 0.1 to 5 | 5 to 85 |
| 110 | Glass | PEI | 1 | 0.1 to 5 | 5 to 45 |
| 111 | Glass | PEI | 1 | 0.1 to 5 | 5 to 30 |
| 112 | Glass | PEI | 1 | 0.1 to 3 | 5 to 85 |
| 113 | Glass | PEI | 1 | 0.1 to 3 | 5 to 45 |
| 114 | Glass | PEI | 1 | 0.1 to 3 | 5 to 30 |
| 115 | Glass | PEI | 2 | 0.1 to 5 | 5 to 85 |
| 116 | Glass | PEI | 2 | 0.1 to 5 | 5 to 45 |
| 117 | Glass | PEI | 2 | 0.1 to 5 | 5 to 30 |
| 118 | Glass | PEI | 2 | 0.1 to 3 | 5 to 85 |
| 119 | Glass | PEI | 2 | 0.1 to 3 | 5 to 45 |
| 120 | Glass | PEI | 2 | 0.1 to 3 | 5 to 30 |
| 121 | Glass | PEI | 3 | 0.1 to 5 | 5 to 85 |
| 122 | Glass | PEI | 3 | 0.1 to 5 | 5 to 45 |
| 123 | Glass | PEI | 3 | 0.1 to 5 | 5 to 30 |
| 124 | Glass | PEI | 3 | 0.1 to 3 | 5 to 85 |
| 125 | Glass | PEI | 3 | 0.1 to 3 | 5 to 45 |
| 126 | Glass | PEI | 3 | 0.1 to 3 | 5 to 30 |
| 127 | Glass | PEI | 1 | 0.1 to 5 | 5 to 85 |
| 128 | Glass | PEI | 1 | 0.1 to 5 | 5 to 45 |
| 129 | Glass | PEI | 1 | 0.1 to 5 | 5 to 30 |
| 130 | Glass | PEI | 1 | 0.1 to 3 | 5 to 85 |
| 131 | Glass | PEI | 1 | 0.1 to 3 | 5 to 45 |
| 132 | Glass | PEI | 1 | 0.1 to 3 | 5 to 30 |
| 133 | Glass | PEI | 2 | 0.1 to 5 | 5 to 85 |
| 134 | Glass | PEI | 2 | 0.1 to 5 | 5 to 45 |
| 135 | Glass | PEI | 2 | 0.1 to 5 | 5 to 30 |
| 136 | Glass | PEI | 2 | 0.1 to 3 | 5 to 85 |
| 137 | Glass | PEI | 2 | 0.1 to 3 | 5 to 45 |
| 138 | Glass | PEI | 2 | 0.1 to 3 | 5 to 30 |
| 139 | Glass | PEI | 3 | 0.1 to 5 | 5 to 85 |
| 140 | Glass | PEI | 3 | 0.1 to 5 | 5 to 45 |
| 141 | Glass | PEI | 3 | 0.1 to 5 | 5 to 30 |
| 142 | Glass | PEI | 3 | 0.1 to 3 | 5 to 85 |
| 143 | Glass | PEI | 3 | 0.1 to 3 | 5 to 45 |
| 144 | Glass | PEI | 3 | 0.1 to 3 | 5 to 30 |

In the embodiments comprising PEKK or PEI, the PEKK may be in a blend with PEI and the PEi may be in a blend with PEKK in the proportions defined above.

Advantageously, in the compositions from table 1 that are defined above in which two compression rollers are present in the fluidized bed, the roller $R_2$ is higher than the roller $R_1$ relative to the bottom of the tank, in particular $H_2-H_1$ is from 1 cm to 30 cm, preferentially from 1 to 10 cm, in particular from 1 cm to 3 cm, especially around 2 cm and the angle $\alpha_2$ is from 0 to 90°, in particular from 25° to 45° C., in particular from 25° to 35° and the roving passes on top of $R_2$.

These embodiments correspond to FIG. 5.

Advantageously, in the compositions from table 1 that are defined above in which two compression rollers are present in the fluidized bed, the roller $R_2$ is higher than the roller $R_1$ relative to the bottom of the tank, in particular $H_2-H_1$ is from 1 cm to 30 cm, especially around 2 cm and the angle $\alpha_2$ is from 90 to 180° C., in particular from 115° to 135°, especially from 115' to 125° and the roving passes underneath $R_2$.

The arrows on the fiber indicate the run direction of the fiber.

Figure 1:
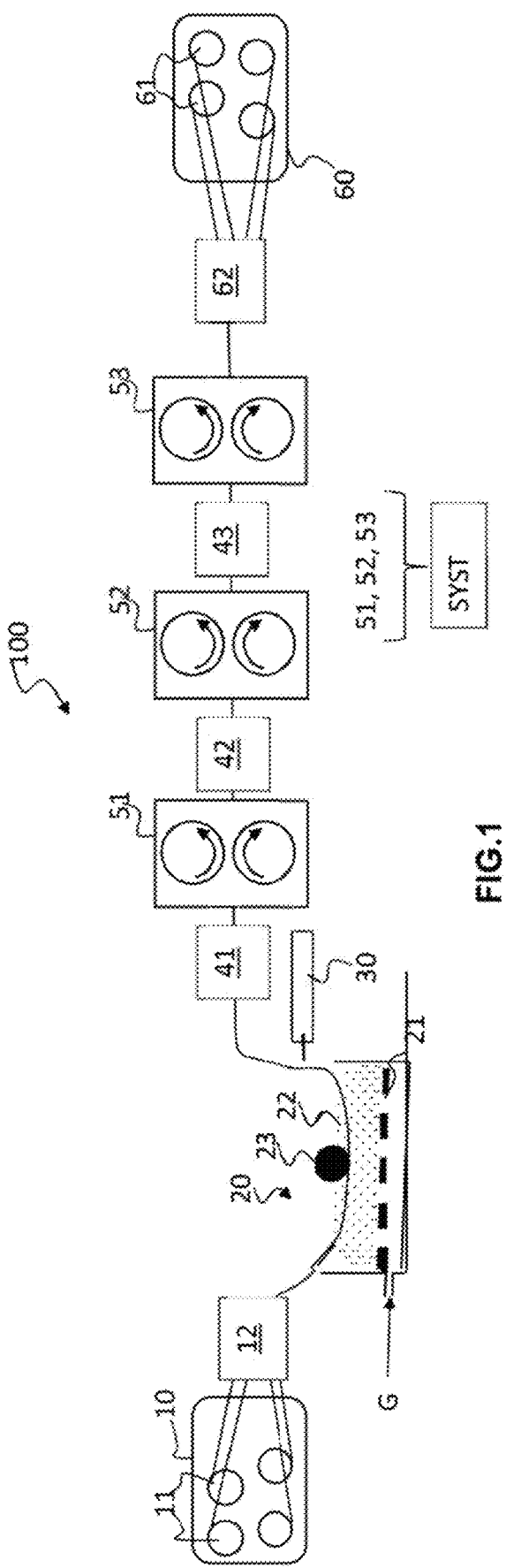
FIG. 1 presents a diagram of a unit for implementing the process for manufacturing a preimpregnated fibrous material according to the invention.
Figure 2:
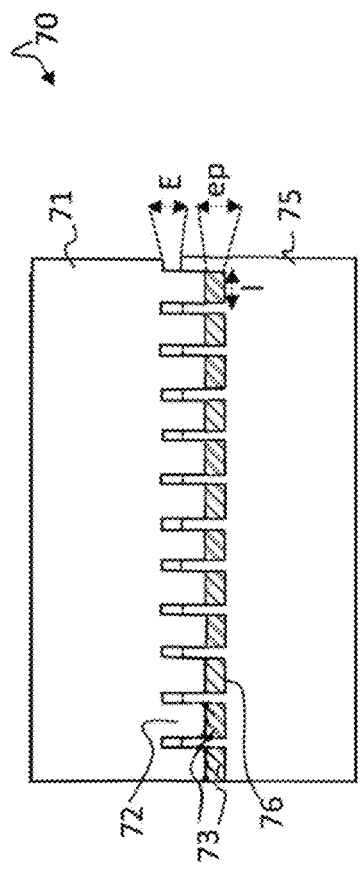
FIG. 2 presents a cross-sectional diagram of two constituent rollers of a calender as used in the unit from FIG. 1.
Figure 3:
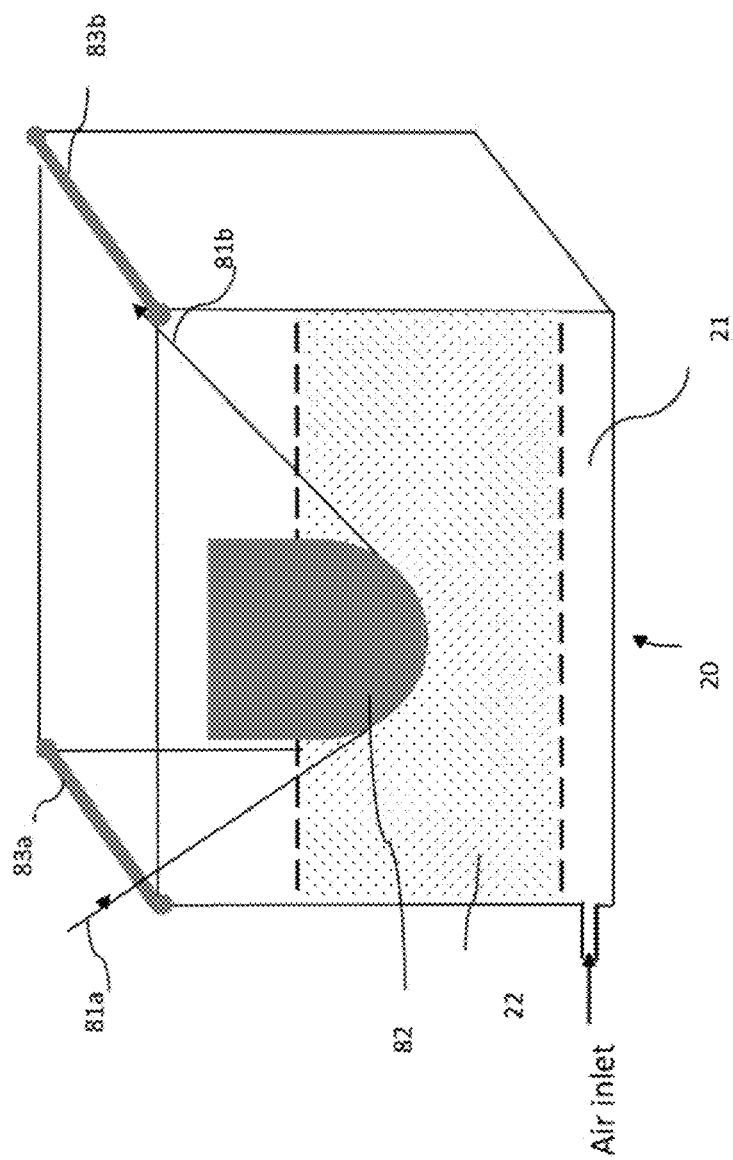
FIG. 3 gives details of a tank (20) comprising a fluidized bed (22) with a height-adjustable tension device (82). The edge of the inlet to the tank is equipped with a rotary roller 83a over which the roving 81a runs and the edge of the tank outlet is equipped with a rotary roller 83b over which the roving 81b runs.
Figure 4:
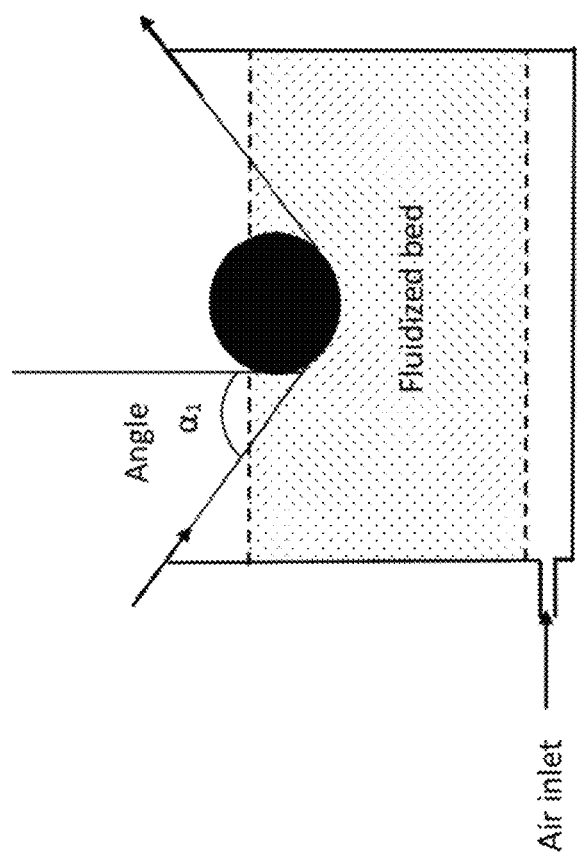
FIG. 4 presents describes an having a single compression roller, with a tank (20) comprising a fluidized bed (22) in which a single cylindrical compression roller is present and showing the angle $\alpha_1$.
Figure 5:
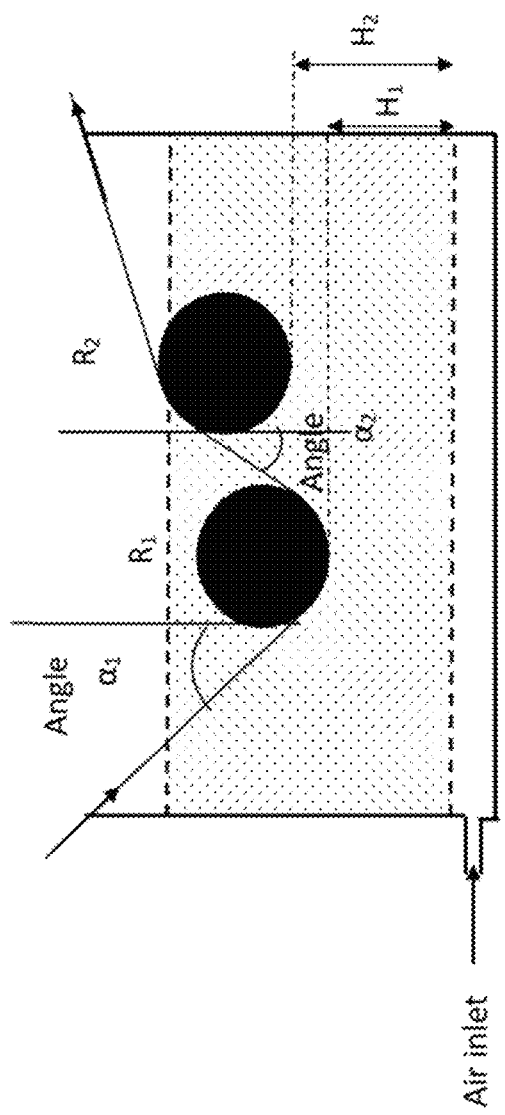

FIG. 5 presents an embodiment, without being limited to thereto, having two compression rollers $R_1$ and $R_2$, $R_1$ preceding $R_2$, with a tank (20) comprising a fluidized bed (22) in which the two cylindrical compression rollers are at different levels relative to the bottom of the tank ($R_2$ at a height $H_2$ above $R_1$ at a height $H_1$) are present and showing the angles $\alpha_1$ and $\alpha_2$.

The arrows on the fiber roving indicate the run direction of the roving.

Figure 6:
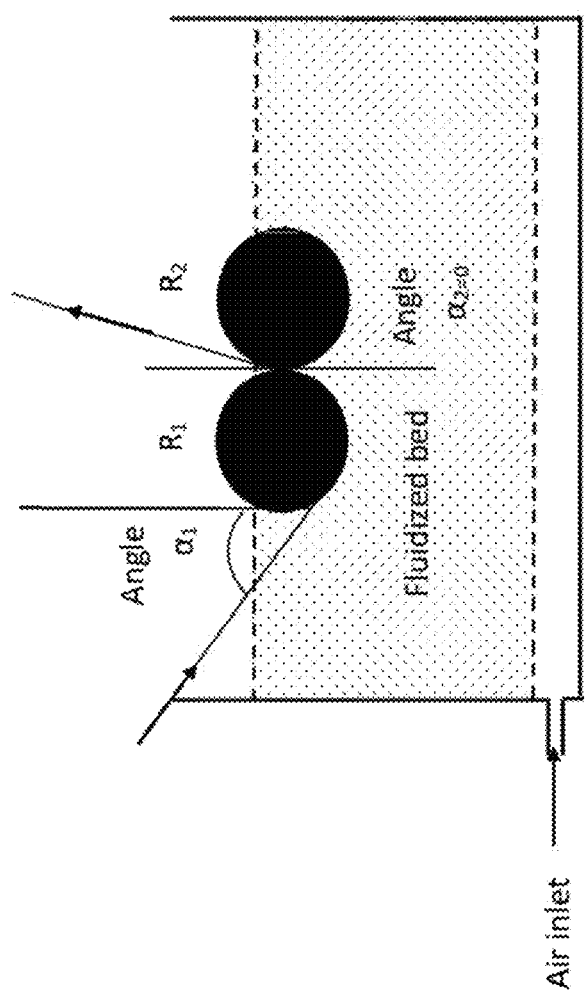

FIG. 6 presents an exemplary embodiment with a tank (20) comprising a fluidized bed (22) in which the two compression rollers $R_1$ and $R_2$ are cylindrical, at the same level relative to one another and side-by-side and showing the angle $\alpha_1$, and the angle $\alpha_2=0°$ and the roving passing between the two rollers.

Figure 7:
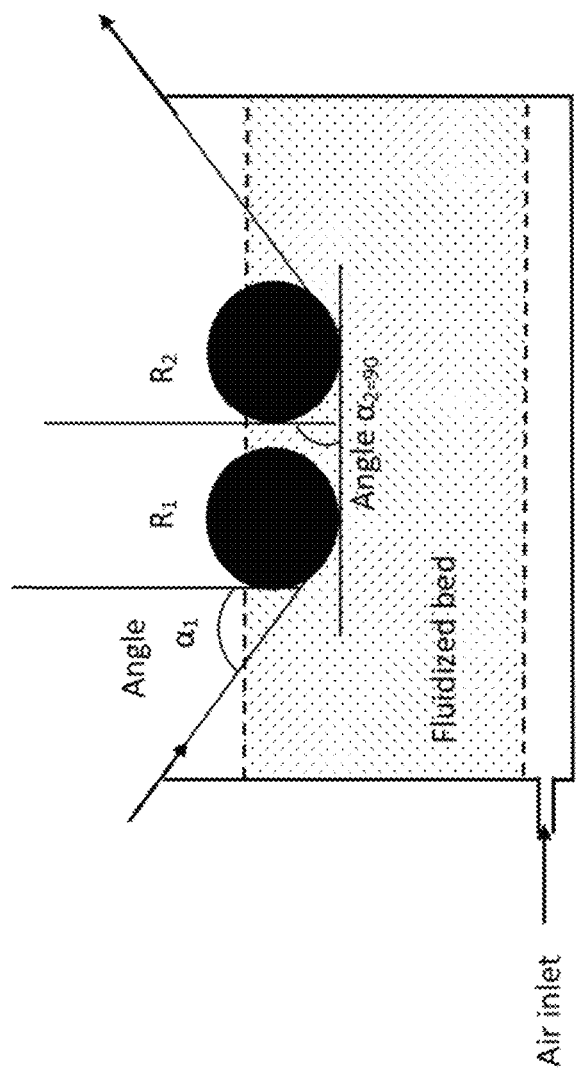

FIG. 7 presents an exemplary embodiment with a tank (20) comprising a fluidized bed (22) in which the two compression rollers $R_1$ and $R_2$ are cylindrical, at the same level relative to one another and side-by-side and showing the angle $\alpha_1$, and the angle $\alpha_2=90°$ and the roving passing underneath $R_2$.

Figure 8:
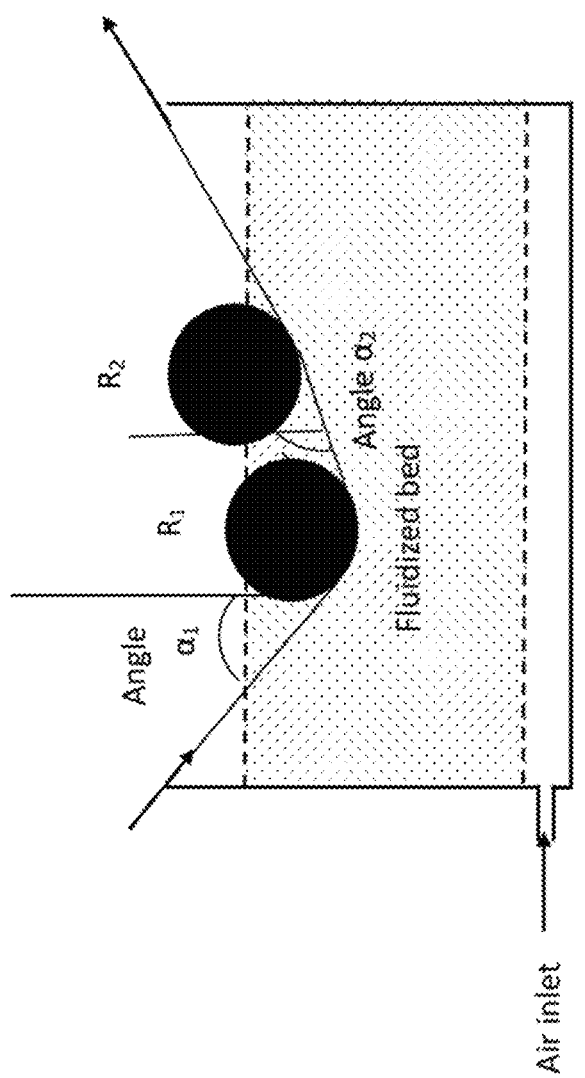

FIG. 8 presents an exemplary embodiment with a tank (20) comprising a fluidized bed (22) in which two compression rollers $R_1$ and $R_2$. $R_1$ preceding $R_2$, at different levels are present and showing the angles $\alpha_1$ and $\alpha_2$ and the roving passing under the roller $R_2$.

Figure 9:
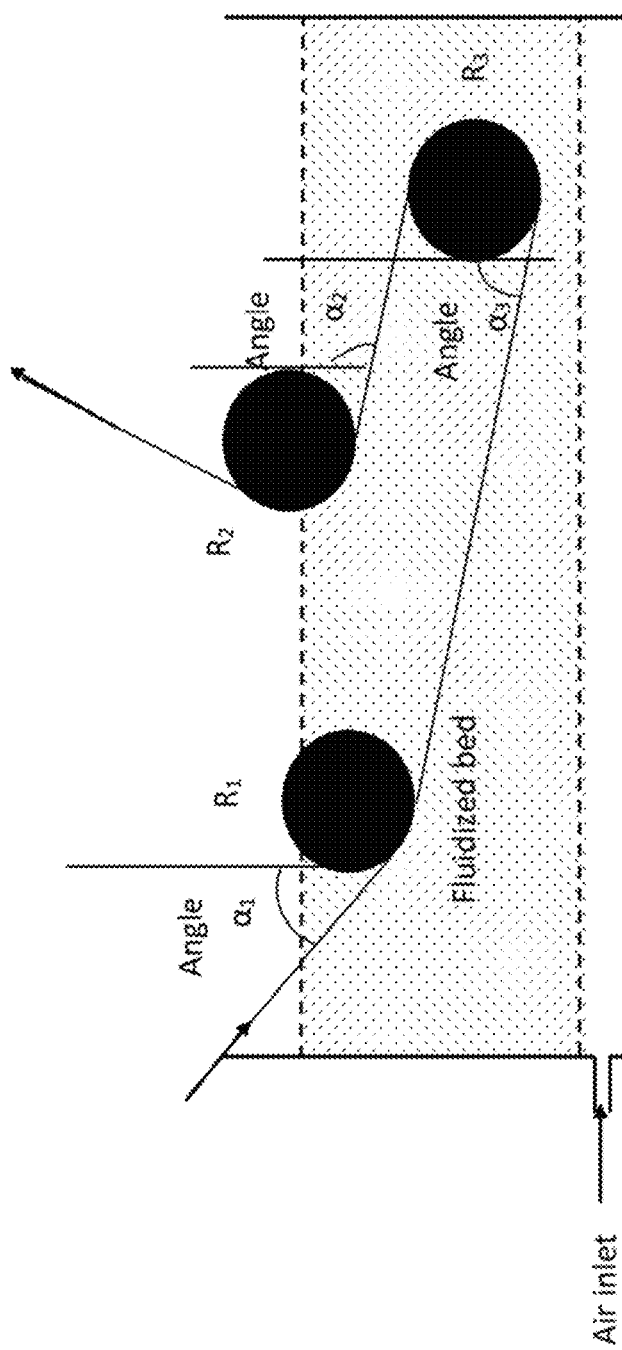

FIG. 9 presents an embodiment with a tank (20) comprising a fluidized bed (22) having two compression rollers $R_1$ and $R_2$, $R_1$ preceding $R_2$, and a compression roller $R_3$ and showing the angles $\alpha_1$, $\alpha_2$ and $\alpha_3$.

Figure 10:
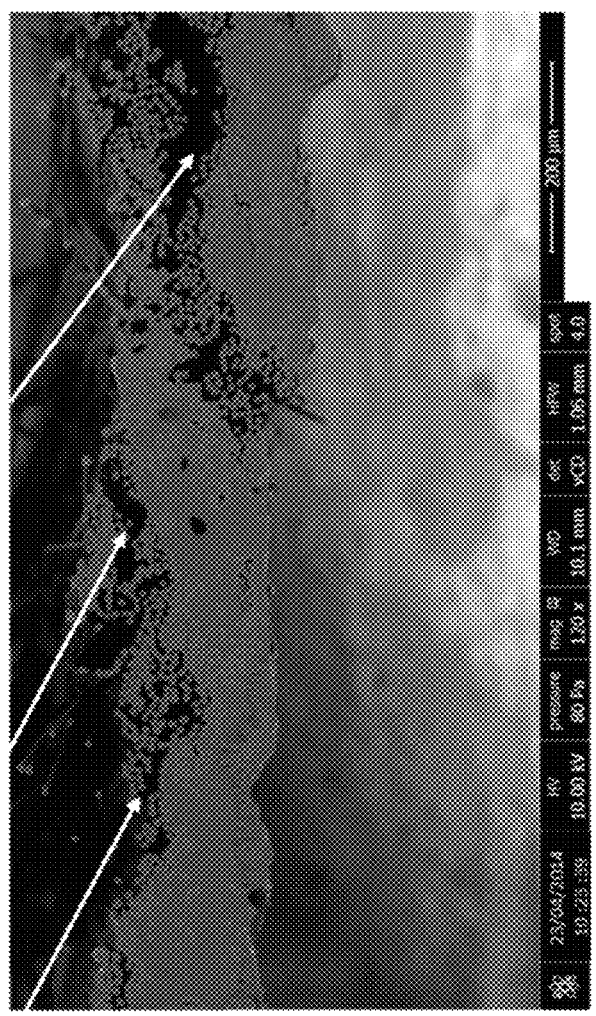

FIG. 10 represents a photo taken with a scanning electron microscope of a cross-sectional view of a carbon fiber (¼' Toray 12K T700S M0E carbon fiber) roving, impregnated by a PA11/6T/10T polyamide powder with D50=100 μm according to the process described in WO 2015/121583 (after calendering).

The process according to WO 2015/121583 reveals a lack of homogeneity at several locations of the preimpregnated roving depicted by the white arrows.

Figure 11:

FIG. 11 represents a photo taken with a scanning electron microscope of a cross-sectional view of a ¼" carbon fiber (Toray 12K T700S M0E fiber) roving, impregnated by a PA MPMDT/10T polyamide powder with D50=115 μm according to the process of the invention (as described in example 2, after calendering).

Image analysis gives a degree of porosity of 5% excluding the edges of the tape.

Figure 12:
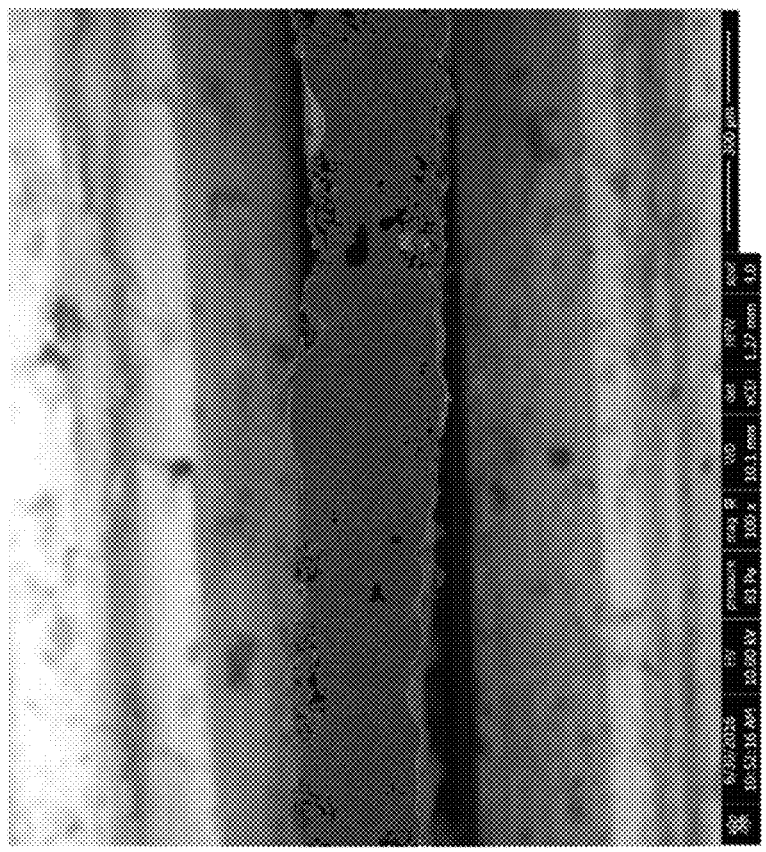

FIG. 12 represents a photo taken with a scanning electron microscope of a cross-sectional view of a ¼" carbon fiber (Toray 12K 1700 fiber) roving, impregnated by a PA 11/6T/10T polyamide powder with D50=132 μm according to the process of the invention (as described in example 2, after calendering).

Figure 13:
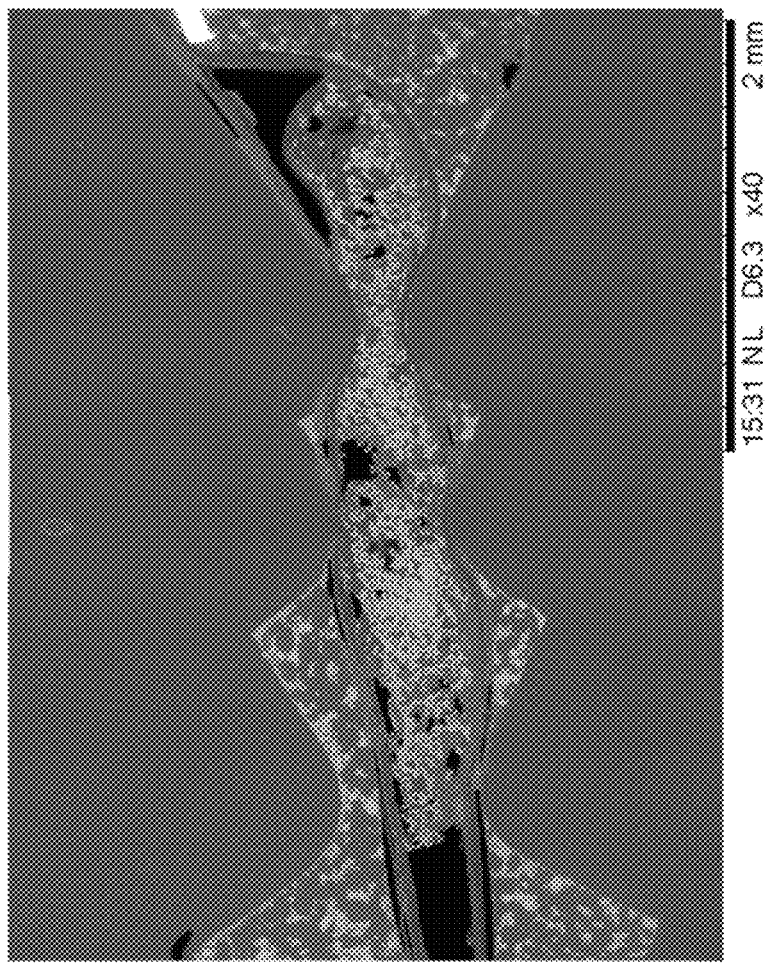

FIG. 13 represents a photo taken with a scanning electron microscope of a cross-sectional view of a 3B HiPer Tex 2400 tex glass fiber roving, impregnated by a PA 11 polyamide powder with D50=120 μm according to the process of the invention (as described in example 3, before calendering).

Figure 14:
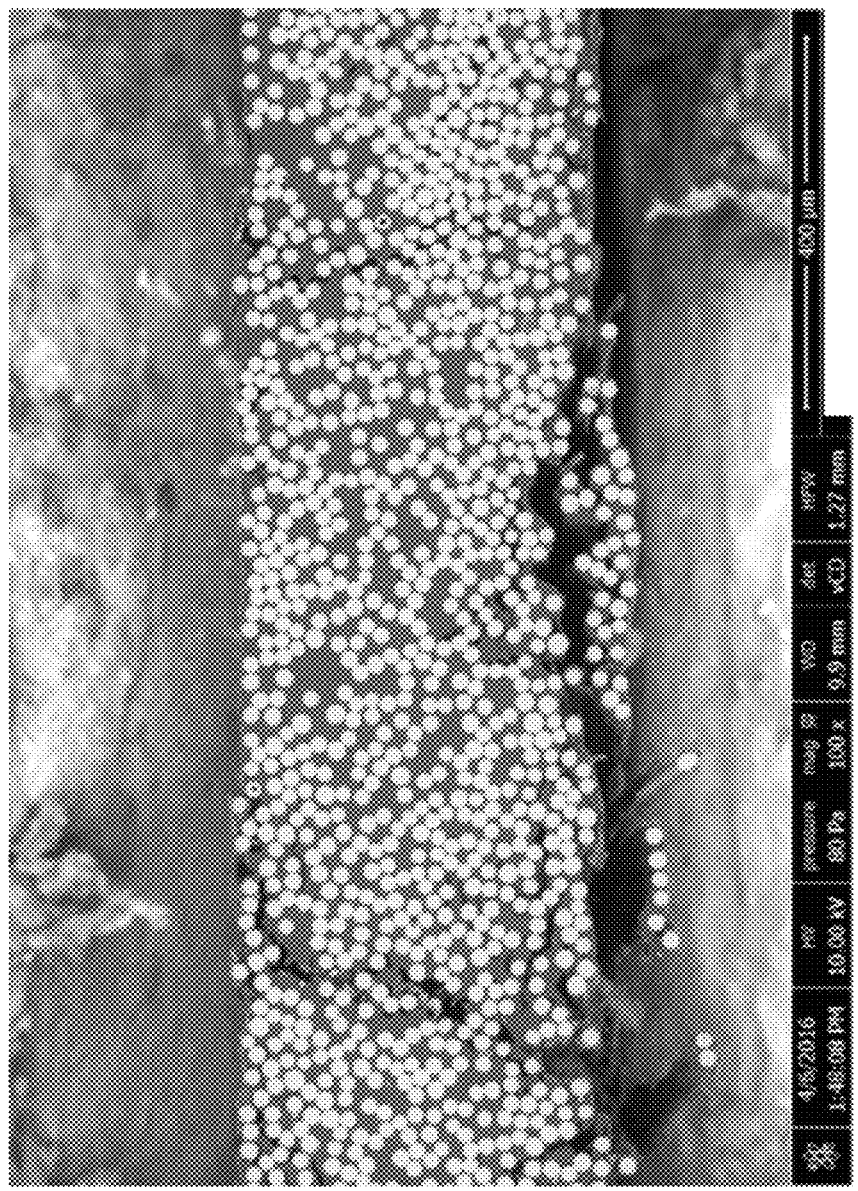

FIG. 14 represents a photo taken with a scanning electron micro cope of a cross-sectional view of a 3B HiPer Tex 2400 tex glass fiber roving, impregnated by a PA 11/6T/10T polyamide powder with D50=132 μm according to the process of the invention (as described in example 3, after calendering).

Figure 15:
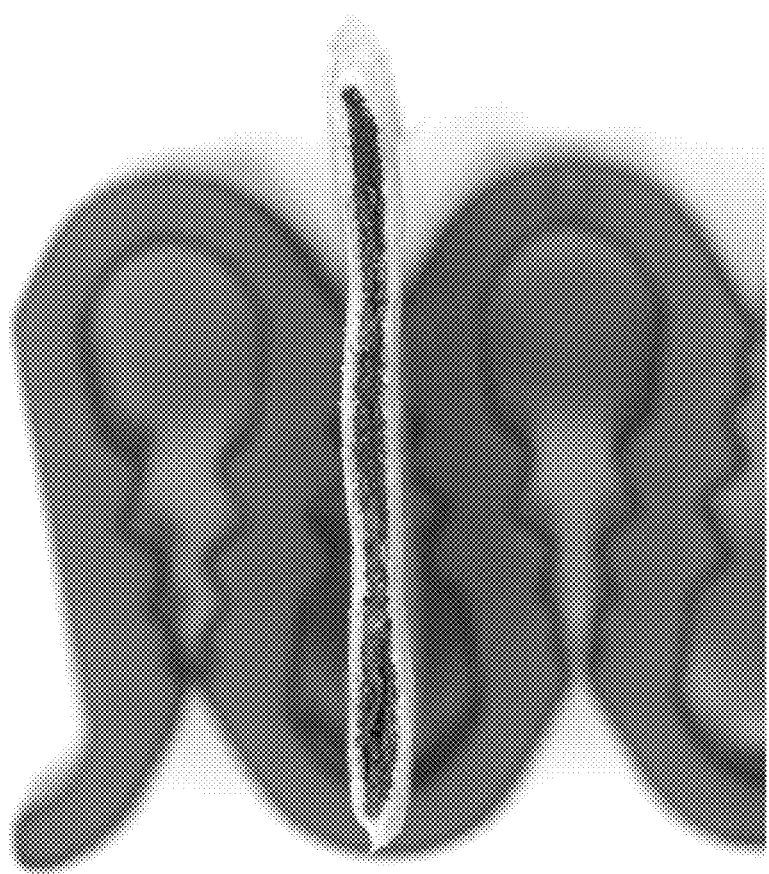

FIG. 15 represents a photo taken with a binocular microscope of a cross-sectional view of a ½" carbon fiber (SGL grade AA, 50K) roving, impregnated by an MPMDT/10T polyamide powder with D50=115 μm according to the process of the invention (as described in example 4, after calendering).

Figure 16:
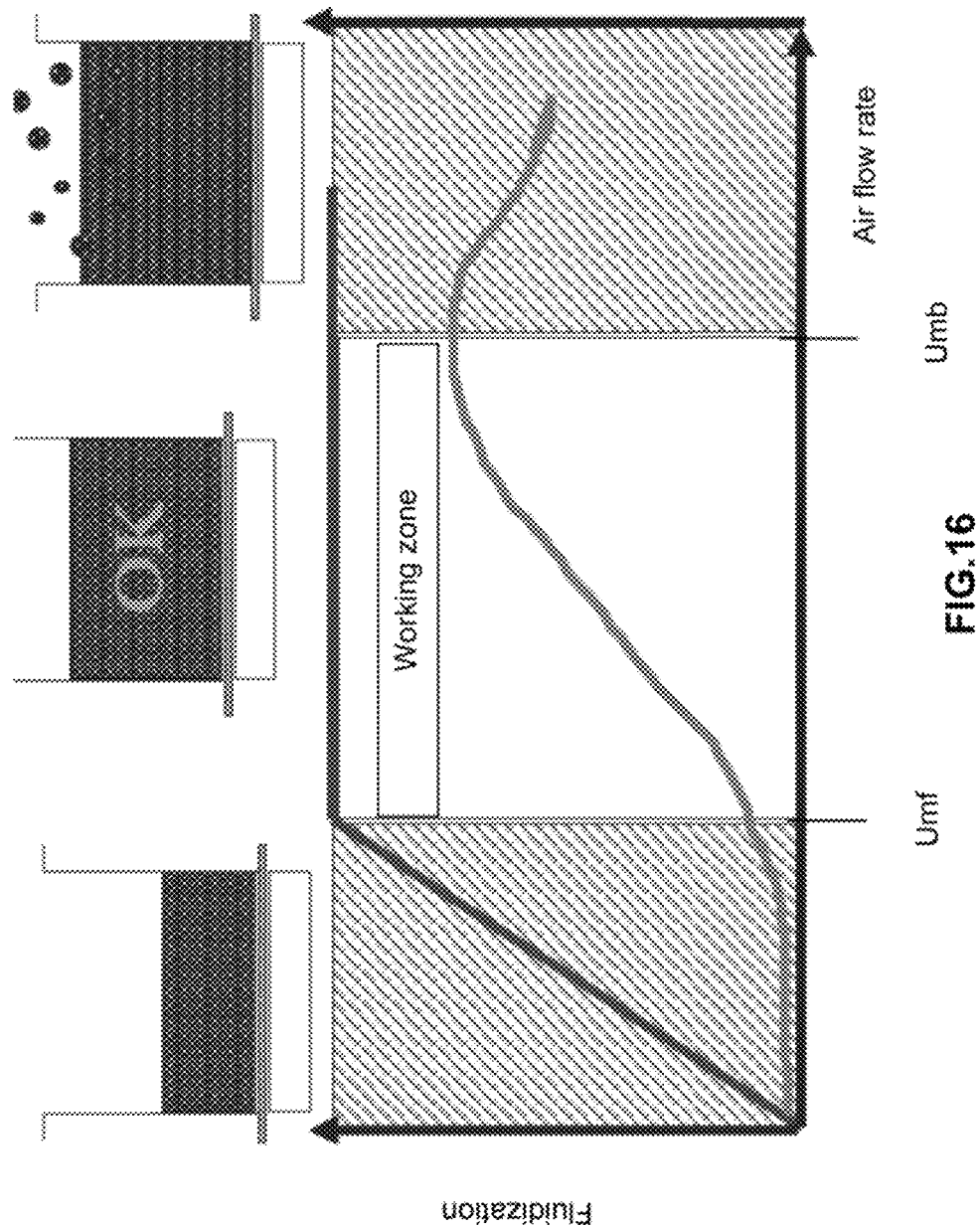

FIG. 16 presents the fluidisation as a function of the flow rate of air. The flow rate of air applied to the fluidized bed must be between the minimum fluidizing flow rate (Umf) and the minimum bubbling flow rate (Umf).

Figure 17:
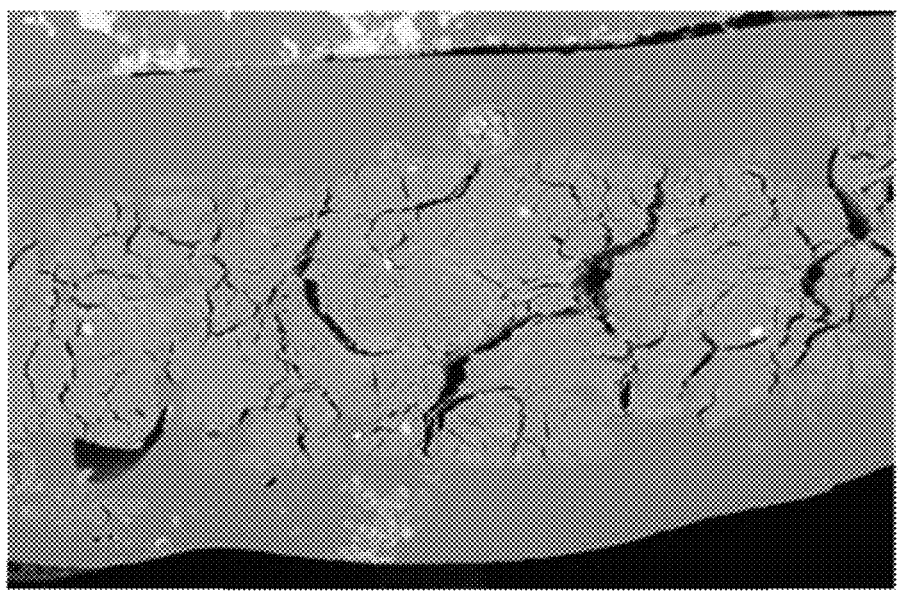

FIG. 17 presents the impregnation of flax fibers by PA11 (D50=15 to 34 μm) obtained by a molten route as a comparative example with the process of the invention (example 3).

Figure 18:

FIG. 18 presents the impregnation of Toray T700 S 24K 60E carbon fibers by MPMDT/10T (D50=115 μm) obtained by a molten route as a comparative example with the process of the invention (example 3).

The following examples nonlimitingly illustrate the scope of the invention.

EXAMPLE 1 (COMPARATIVE EXAMPLE)

A 12K carbon fiber roving was impregnated with PA 11/6T/10T as described in WO 2015/121583.
D50=100 μM.
Results:
The results are presented in FIG. 10 and show a lack of homogeneity at several locations of the preimpregnated roving depicted by the white arrows.

EXAMPLE 2

General Procedure for Impregnating a (Carbon Fiber) Fibrous Material with a Polyamide Powder in a Fluidized Bed with a Single Roller The following procedure was carried out:
A cylindrical compression roller in the tank (L=500 mm, W=500 mm, H=600 mm), diameter 25 mm.
Residence time of 0.3 sec in the powder
Angle $\alpha_1$ of 25°
Fanning out of around 100% (i.e. a width multiplied by 2) for a ¼" Toray, 12K T700S M0E carbon fiber roving D50=115 μm, (D10=49 μm, D90=207 μm) for the MPMDT/10T powder.
D50=132 μm, (D10=72 μm and D90=225 μm) for the 11/6T/10T powder.
edge of the tank equipped with a fixed roller.

The fibrous material (¼" carbon fiber roving) was pre-impregnated by various polyamides (MPMDT/10T and PA 11/6T/10T of particle size defined above) according to this procedure and are presented in FIGS. 11 and 12. FIG. 11 corresponds to MPMDT/10T, FIG. 12 to PA 11/6T/10T.

This demonstrates the effectiveness of the process of impregnation by a dry powder in a fluidized bed with a compression roller and control of the residence time in the powder.

EXAMPLE 3

General Procedure for Impregnating a (Glass Fiber) Fibrous Material with a (PA11 and 11/6T/10T) Polyamide Powder in a Fluidized Bed with a Single Roller The following procedure was carried out:
A fixed compression roller in the tank with a diameter of 6 mm
Residence time of around 5 sec
Angle $\alpha_1$ of 45°
D50 of the PA11 powder of 120 μm (D10=60 μm and D90=210 μm).
D50 of the PA11/6T/10T powder of 132 μm (D10=60 μm and D90=210 μm).
Edge of the tank equipped with a fixed roller.

The fibrous material (2400 tex glass fiber roving) was preimpregnated by various polyamides (PA11 and 11/6T/10T) according to this procedure and are presented in FIGS. 13 and 14. FIG. 13 corresponds to PA11 and FIG. 14 to PA 11/6T/10T.

This demonstrates the effectiveness of the process of impregnation by a dry powder in a fluidized bed with a compression roller and control of the residence time in the powder.

EXAMPLE 4

General Procedure for Impregnating a Fibrous Material with a Polyamide Powder in a Fluidized Bed with Two Rollers Two cylindrical compression rollers having a height difference $H_2-H_1$=2 cm, in the tank (L=500 mm, W=500, H=600), both having a diameter of 25 mm. Distance between rollers around 1 cm (as represented in FIG. 5)
Residence time of 2 sec in the powder
Angle $\alpha_1$ of 25° and angle $\alpha_2$ of 30°
Fanning out of around 100% (i.e. a width multiplied by 2) for a ½" SGL grade AA carbon fiber roving
D50 of the powder of 98.9 μm.
edge of the tank equipped with a rotary roller.

The fibrous material (½" carbon fiber roving) preimpregnated by a MPMDT/10T polyamide) was prepared according to this procedure and is presented in FIG. 15 (binocular microscope view).

The degree of impregnation is 40%.

This demonstrates the effectiveness of the process of impregnation by a dry powder in a fluidized bed with two compression rollers and control of the residence time in the powder.

EXAMPLE 5

Determination of the Degree of Porosity Bu Image Analysis

The porosity was determined by image analysis on a ½" carbon fiber roving impregnated by MPMDT/10T. It is 5%.

EXAMPLE 6

Determination of the Degree of Porosity—the Relative Deviation Between Theoretical Density and Experimental Density (General Method)

a) The data required are:
The density of the thermoplastic matrix
The density of the fibers
The basis weight of the reinforcement:
linear density (g/m) for example for a ¼ inch tape (derived from a single roving)
surface density (g/m²) for example for a wider tape or a woven fabric b) Measurements to be performed:
The number of samples must be at least 30 so that the result is representative of the material studied.
The measurements to be performed are:
The size of the samples taken:
  Length (if linear density is known).
  Length and width (if surface density is known).
The experimental density of the samples taken:
  Measurements of mass in air and in water.
Measurement of the content of fibers is determined according to ISO 1172: 1999 or by thermogravimetric analysis (TGA) as determined for example in document B. Benzier, Applikationslabor, Mettler Toledo, Giesen, UserCom 1/2001.
The measurement of the content of carbon fibers may be determined according to ISO 14127: 2008.
Determination of the theoretical weight content of fibers:
a) Determination of the theoretical weight content of fibers:

$$\% Mf_{th} = \frac{m_l \cdot L}{Me_{air}}$$

with
$m_l$ the linear density of the tape,
L the length of the sample and
$Me_{air}$ the mass of the sample measured in air.
The variation in the weight content of fibers is assumed to be directly linked to a variation in the content of matrix without taking into account the variation in the amount of fibers in the reinforcement.

b) Determination of the theoretical density:

$$d_{th} = \frac{1}{\frac{1 - \% Mf_{th}}{d_m} + \frac{\% Mf_{th}}{d_f}}$$

with $d_m$ and $d_f$ the respective densities of the matrix and of the fibers.

The theoretical density thus calculated is the accessible density if there is no porosity in the samples.

c) Evaluation of the porosity;
The porosity is then the relative deviation between the theoretical density and the experimental density.

The invention claimed is:

1. A process for manufacturing a preimpregnated fibrous material comprising a fibrous material made of continuous fibers and at least one thermoplastic polymer matrix,
wherein the preimpregnated fibrous material is produced as a single unidirectional tape or as a plurality of parallel unidirectional tapes,
wherein the process comprises impregnating a fibrous material, that is in the form of a roving or of several parallel rovings, with the at least one thermoplastic polymer matrix having the form of a powder,
the impregnating being carried out by a dry route in a tank comprising a fluidized bed, where control of the amount of the at least one thermoplastic polymer matrix in the fibrous material is achieved by control of residence time of the fibrous material in the powder, with exclusion of any electrostatic process with intentional charging,
the volume mean diameter D50 of particles of the powder of the thermoplastic polymer matrix being from 30 to 300 μm,
the impregnation being carried out with simultaneous fanning out of the roving or of the rovings between an inlet and an outlet of the fluidized bed, where the fluidized bed comprises at least one tension device, the roving or the rovings being in contact with a portion or the whole of the surface of the at least one tension device, and where the at least one tension device is a compression roller of convex, concave or cylindrical shape, the compression roller having a diameter of from 3 mm to 500 mm,
wherein the residence time in the powder is from 0.01 s to 10 s, and
wherein the number-average molecular weight Mn of a final polymer present in the thermoplastic matrix is within a range from 10,000 to 40,000.

2. The process as claimed in claim 1, wherein the content of fibers in the impregnated fibrous material is from 45% to 65% by volume.

3. The process as claimed in claim 1, wherein the fanning out of the roving or of the rovings is carried out at least at the at least one tension device.

4. The process as claimed in claim 1, wherein the at least one compression roller is of a cylindrical shape and the percentage of fanning out of the roving or of the rovings between the inlet and the outlet of the fluidized bed is from 1% to 400%.

5. The process as claimed in claim 4, wherein a single compression roller is present in the fluidized bed and the impregnation is carried out at an angle $\alpha_1$ formed by the roving or the rovings between the start of the compression roller and the vertical tangent to the compression roller.

6. The process as claimed in claim 5, wherein the angle $\alpha_1$ is from 0 to 89°.

7. The process as claimed in claim 4, wherein two compression rollers $R_1$ and $R_2$ are present in the fluidized bed and the impregnation is carried out at an angle $\alpha_1$ formed by the roving or the rovings between the start of the compression roller $R_1$ and the vertical tangent to the compression roller and/or at an angle $\alpha_2$ formed by the roving or the rovings between the start of the compression roller $R_2$ and the vertical tangent to the compression roller $R_2$, the compression roller $R_1$, in the run direction of the process, preceding the compression roller $R_2$ and the roving or the rovings being able to pass on top of or underneath the roller $R_2$.

8. The process as claimed in claim 7, wherein the two compression rollers $R_1$ and $R_2$ are at a distance of from 0.15 mm to the length equivalent to the maximum dimension of the tank and the difference in height between the two compression rollers $R_1$ and $R_2$ is from 0 to the height corresponding to the maximum height of the tank minus the diameters of the two compression rollers, $R_2$ being the upper compression roller.

9. The process as claimed in claim 1, wherein a single thermoplastic polymer matrix is used and the powder of the thermoplastic polymer powder is fluidizable.

10. The process as claimed in claim 1, wherein the process further comprises shaping the roving or the parallel rovings of the impregnated fibrous material, by calendering with at least one heated calender in the form of a single unidirectional tape or of a plurality of parallel unidirectional tapes with, in the latter case, the heated calender comprising a plurality of calendering grooves, in accordance with the number of the tapes and with a pressure and/or a spacing between the rollers of the calender that are regulated by a servo control system.

11. The process as claimed in claim 10, wherein the calendering is carried out by a plurality of heated calenders, mounted in parallel and/or in series relative to the run direction of the fiber rovings.

12. The process as claimed in claim 10, wherein the heated calender(s) comprise(s) an integrated induction or microwave heating system, coupled with the presence of carbon-based fillers in the thermoplastic polymer or blend of thermoplastic polymers.

13. The process as claimed in claim 10, wherein the heated calender(s) is/are coupled to a complementary rapid heating device, located before and/or after the/each calender.

14. The process as claimed in claim 1, wherein the impregnating is completed by covering the single roving or the plurality of parallel rovings after impregnation by the powder, the covering being carried out before the calendering, by a molten thermoplastic polymer, which may be identical to or different from the thermoplastic polymer matrix in the form of a powder in the fluidized bed.

15. The process as claimed in claim 1, wherein the thermoplastic polymer matrix further comprises carbon-based fillers.

16. The process as claimed in claim 1, wherein the thermoplastic polymer matrix further comprises liquid crystal polymers or cyclic polybutylene terephthalate, or mixtures containing same as additives.

17. The process as claimed in claim 1, the thermoplastic polymer matrix comprises at least one thermoplastic polymer selected from the group consisting of: polyaryl ether ketones (PAEKs); polyaryl ether ketone ketones (PAEKKs); aromatic polyether imides (PEIs); polyaryl sulfones; polyaryl sulfides; polyamides (PAs); PEBAs; polyacrylates; polyolefins; polylactic acid (PLA); polyvinyl alcohol (PVA); and fluoropolymers.

18. The process as claimed in claim 17, wherein the at least one thermoplastic polymer is a polymer having a glass transition temperature such that Tg 80° C. or a semicrystalline polymer having a melting temperature Tm 150° C.

19. The process as claimed in claim 1, wherein the fibrous material comprises continuous fibers selected from carbon fibers, glass fibers, silicon carbide fibers, basalt fibers, silica fibers, natural fibers, or amorphous thermoplastic fibers having a glass transition temperature Tg above the Tg of the polymer or of the blend of polymers when the latter is amorphous or above the Tm of the polymer or of the blend of polymers when the latter is semicrystalline, or semicrystalline thermoplastic fibers having a melting temperature Tm above the Tg of the polymer or of the blend of polymers when the latter is amorphous or above the Tm of the polymer or of the blend of polymers when the latter is semicrystallin, or a mixture of two or more of the fibers.

20. A unidirectional tape of preimpregnated fibrous material, wherein the unidirectional tape is obtained by a process in accordance with claim 1.

21. The unidirectional tape as claimed in claim 20, where the tape has a width (I) and a thickness (ep) that are suitable for robotic layup in the manufacture of three-dimensional parts, with no need for slitting.

22. The unidirectional tape as claimed in claim 20, wherein the thermoplastic polymer is a polyamide.

23. The process as claimed in claim 1, for the manufacture of calibrated tapes suitable for the manufacture of three-dimensional composite parts, by automated layup of the tapes using a robot.

24. The use of the tape of preimpregnated fibrous material, as claimed in claim 20, in the manufacture of three-dimensional composite parts.

25. The use as claimed in claim 24, wherein the manufacture of the composite parts relates to a field selected from the group consisting of transport, oil and gas; renewable energy; sports and leisure; health and medical; ballistics with weapon or missile parts; and safety and electronics.

26. A three-dimensional composite part, wherein the three-dimensional part results from the use of at least one unidirectional tape of preimpregnated fibrous material as claimed in claim 20.

27. The process as claimed in claim 1, wherein the compression roller has a diameter of from 10 mm to 100 mm.

* * * * *